United States Patent
Maeda

(10) Patent No.: US 8,305,416 B2
(45) Date of Patent: Nov. 6, 2012

(54) IMAGE FORMING APPARATUS, OPTICAL WRITING PROCESS CONTROL METHOD, AND OPTICAL WRITING PROCESS CONTROL PROGRAM

(75) Inventor: Katsuhiko Maeda, Kawasaki (JP)

(73) Assignee: Ricoh Company, Ltd., Tokyo (JP)

(*) Notice: Subject to any disclaimer, the term of this patent is extended or adjusted under 35 U.S.C. 154(b) by 310 days.

(21) Appl. No.: 12/725,600

(22) Filed: Mar. 17, 2010

(65) Prior Publication Data
US 2010/0238261 A1 Sep. 23, 2010

(30) Foreign Application Priority Data
Mar. 18, 2009 (JP) ................................. 2009-066744

(51) Int. Cl.
*B41J 2/447* (2006.01)
(52) U.S. Cl. ...................................................... 347/237
(58) Field of Classification Search .................. 347/233, 347/237, 243
See application file for complete search history.

(56) References Cited

U.S. PATENT DOCUMENTS
5,512,927 A * 4/1996 Okamoto ...................... 347/129
5,561,285 A * 10/1996 Sakata et al. .................. 250/205

FOREIGN PATENT DOCUMENTS
JP 2002-166592 6/2002
JP 2002-225346 8/2002

* cited by examiner

*Primary Examiner* — Huan Tran
(74) *Attorney, Agent, or Firm* — Oblon, Spivak, McClelland, Maier & Neustadt, L.L.P.

(57) ABSTRACT

An image forming apparatus includes light sources, a light intensity controller, an optical writing unit, a controller, and an image forming unit. The light sources are switchable between activated and deactivated conditions according to supplied image data. The light intensity controller controls light intensity of the light sources. In the optical writing unit, light beams output from the light sources are deflected in a main scanning direction. The controller sets a given number of light sources to activated condition to write a latent image on an image bearing member according to an image forming line speed. The controller instructs the given number of light sources to emit light beams onto an image area on the image bearing member, and instructs all of the light sources to emit light beams at a blank area on the image bearing member to execute a light intensity control for all of the light sources.

18 Claims, 19 Drawing Sheets

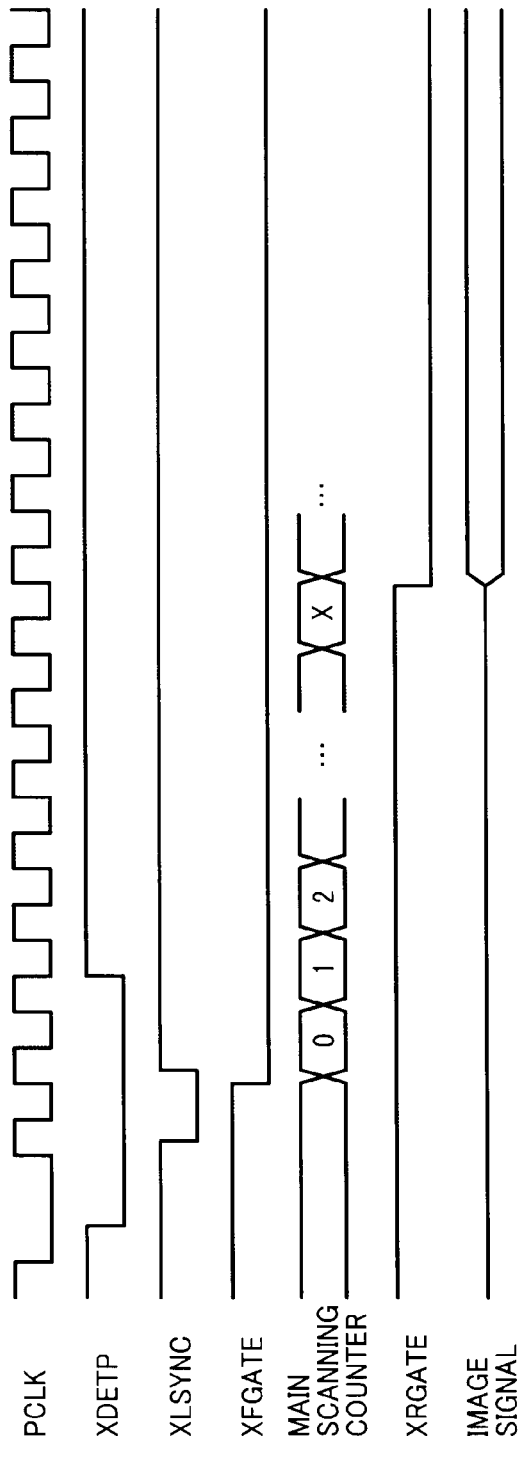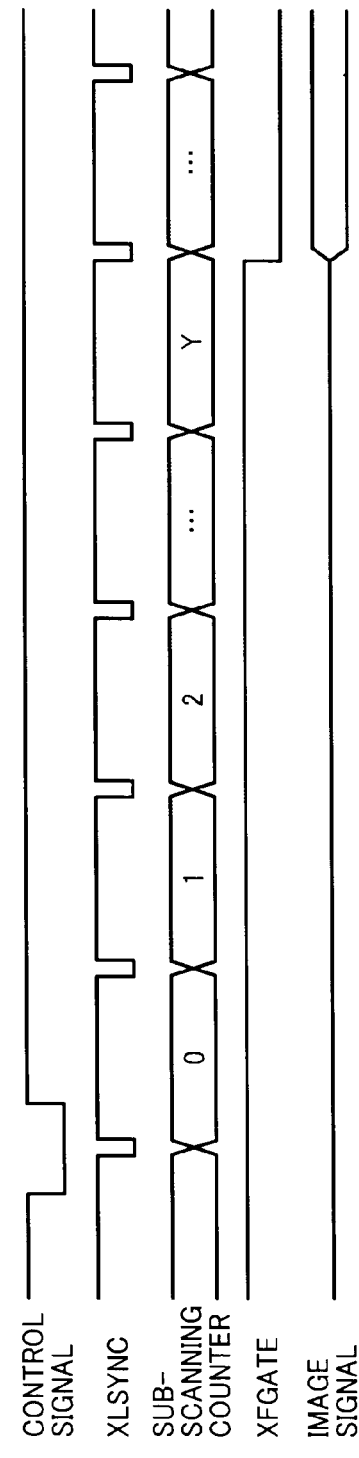

IMAGE FORMING APPARATUS, OPTICAL WRITING PROCESS CONTROL METHOD, AND OPTICAL WRITING PROCESS CONTROL PROGRAM

CROSS-REFERENCE TO RELATED APPLICATIONS

This application claims priority to Japanese Patent Application No. 2009-066744, filed on Mar. 18, 2009 in the Japan Patent Office, which is hereby incorporated by reference herein in its entirety.

BACKGROUND OF THE INVENTION

1. Field of the Invention

The present invention relates to an image forming apparatus, which manages light intensity of light beams emitted by an optical writing unit such as a multi-beam writing unit when image forming line speed is switched, an optical writing control method employed by the image forming apparatus, and a program for implementing optical writing control for an image forming apparatus.

2. Description of the Background Art

Image forming apparatuses employing electrophotography have an optical writing unit, an image-bearing member (hereinafter, referred to as a "photoconductor"), and a development unit, and form an image on a recording medium. Specifically, a latent image is formed on the photoconductor by directing a light beam onto the photoconductor using the optical writing unit, with the light beam representing image data. The latent image is developed as a toner image by the development unit, and then transferred onto the recording medium. In such image forming apparatuses, the optical writing unit has a light source, such as a laser diode (LD), which can be controlled to an activated condition at a given timing to write a latent image corresponding to the image data.

In such image forming apparatuses, the image forming line speed may be changed depending on the type of recording medium. For example, an image forming line speed for an overhead projector (OHP) sheet or thick paper may be set slower than an image forming line speed for plain paper when an image forming operation is conducted. Specifically, when an image forming operation is conducted for OHP sheet or thick paper, the image forming line speed is set to a slower speed in order to allow the toner to melt effectively, so that no reflection appears at the boundaries of toner particles. With such configuration, image color haziness can be prevented and thereby vivid images can be formed. Further, setting a slower image forming line speed can enhance image glossiness.

JP-2002-166592-A discloses an image forming apparatus that includes such a configuration for adjusting the image forming line speed. More specifically, JP-2002-166592-A discloses an image forming apparatus including a multi-beam optical system to write a latent image on an image bearing member, in which two or more light sources are used to emit a plurality of laser beams to write latent images on the image bearing member. In addition, the image forming apparatus includes a writing controller and LD driver to switch the numbers of beams used by the multi-beam optical system. The multi-beam optical system may switch or change the numbers of beams used for image writing depending on the image forming mode, defined by factors such as image density level, switching of transport speed depending on types of transfer member, and so forth, and including speed mode/image quality mode, plain paper mode/special paper mode, and/or full-color mode/black-and-white mode. With such a configuration, image forming can be conducted under various types of image forming modes without posing an undue burden on the polygon mirror motor that is the heart of the system.

In JP-2002-166592-A, the number of beams (hereinafter "beam number") used by the multi-beam scanning system or unit can be switched or changed as follows. When the beam number is to be decreased, the number of laser diodes (LDs) to be set at activated condition is decreased (i.e., the number of deactivated LDs is increased), and when the beam number is to be increased, the number of LDs to be set at activated condition is increased. When the beam number is to be increased, a light beam detector detects a newly increased light beam to set a main scanning line synchronization signal for the newly increased light beam. In such detection process, one line scanning operation is required while maintaining an activated condition for LD, which is newly used as a light source due the beam number increase.

However, if one line scanning operation is conducted, a light beam scans for one line on a photoconductor, by which a toner image may be formed unnecessarily. Further, when a LD is shifted from a deactivated condition to an activated condition, the LD may need more time than one line scanning operation to set a light intensity of LD at a required level, by which the toner image may be further formed unnecessarily. Further, when the beam number is switched or changed, various control processes may be required, by which more time may be needed for setting the required beam number, and thereby throughput performance of the apparatus, such as print speed, may deteriorate to slower speed. When an image forming operation is conducted, neither such unnecessary toner image formation nor the deterioration in print speed is desirable.

SUMMARY

In one aspect of the invention, an image forming apparatus is devised. The image forming apparatus including a plurality of light sources, a light intensity controller, an optical writing unit, a controller, and an image forming unit. Each of the light sources is switchable between an activated condition and a deactivated condition according to supplied image data. The light intensity controller executes light intensity control to control light intensity of each one of the light sources. The optical writing unit includes a deflector to deflect a plurality of light beams output from the plurality of light sources in a main scanning direction. The controller sets a given number of light sources to the activated condition to optically write a latent image on an image bearing member according to an image forming line speed of the light scanning unit. The image forming unit develops the latent image written on the image bearing member as a visible image to be formed on a recording medium. The controller instructs the given number of light sources to emit light beams onto an image area set on the image bearing member based on the supplied image data, and instructs all of the light sources to emit light beams at a blank area set on the image bearing member to execute a light intensity control for all of the light sources.

In another aspect of the invention, a method of controlling light intensity of a plurality of light sources useable in an image forming apparatus is devised. The image forming apparatus including a plurality of light sources, a light intensity controller, an optical writing unit, a controller, and an image forming unit. Each of the light sources is switchable between an activated condition and a deactivated condition according to supplied image data. The light intensity controller executes light intensity control to control light intensity of each one of the light sources. The optical writing unit includes a deflector to deflect a plurality of light beams output from the plurality of light sources in a main scanning direction. The controller sets a given number of light sources to the activated condition to optically write a latent image on an image bearing member according to an image forming line speed of the light scanning unit. The image forming unit develops the latent image written on the image bearing member as a visible image to be formed on a recording medium. The controller instructs the given number of light sources to emit light beams onto an image area set on the image bearing member based on the supplied image data, and instructs all of the light sources to emit light beams at a blank area set on the image bearing member to execute a light intensity control for all of the light sources. The method including establishing, emitting, and executing. The establishing step establishes one or more mutually exclusive image areas and one or more image-non-writing areas on the image bearing member. The emitting step emits light beams from a given number of light sources onto the one or more image areas established on the image bearing member based on the supplied image data. The executing step executes light intensity control for all of the light sources by emitting light beams from all of the light sources at one or more of the one or more blank areas established on the image bearing member.

In another aspect of the invention, a computer-readable medium storing a program for controlling light intensity of an image forming apparatus is devised. The program including instructions that when executed by a computer cause the computer to execute a method of controlling light intensity of the plurality of light sources. The image forming apparatus including a plurality of light sources, a light intensity controller, an optical writing unit, a controller, and an image forming unit. Each of the light sources is switchable between an activated condition and a deactivated condition according to supplied image data. The light intensity controller executes light intensity control to control light intensity of each one of the light sources. The optical writing unit includes a deflector to deflect a plurality of light beams output from the plurality of light sources in a main scanning direction. The controller sets a given number of light sources to the activated condition to optically write a latent image on an image bearing member according to an image forming line speed of the light scanning unit. The image forming unit develops the latent image written on the image bearing member as a visible image to be formed on a recording medium. The controller instructs the given number of light sources to emit light beams onto an image area set on the image bearing member based on the supplied image data, and instructs all of the light sources to emit light beams at a blank area set on the image bearing member to execute a light intensity control for all of the light sources. The method including establishing, emitting, and executing. The establishing step establishes one or more mutually exclusive image areas and one or more image-non-writing areas on the image bearing member. The emitting step emits light beams from a given number of light sources onto the one or more image areas established on the image bearing member based on the supplied image data. The executing step executes light intensity control for all of the light sources by emitting light beams from all of the light sources at one or more of the one or more blank areas established on the image bearing member.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11 illustrates a timing chart of output timing of PCLK, XDETP, XLSINC, XFGATE, main scanning counter, XRGATE, and image signal by the writing start-position controller for main scanning direction;

FIG. 12 illustrates a timing chart of output timing of control signal, XLSYNC, sub-scanning counter, XFGATE, and image signal by the writing start-position controller for sub-scanning direction;

Figure 1:
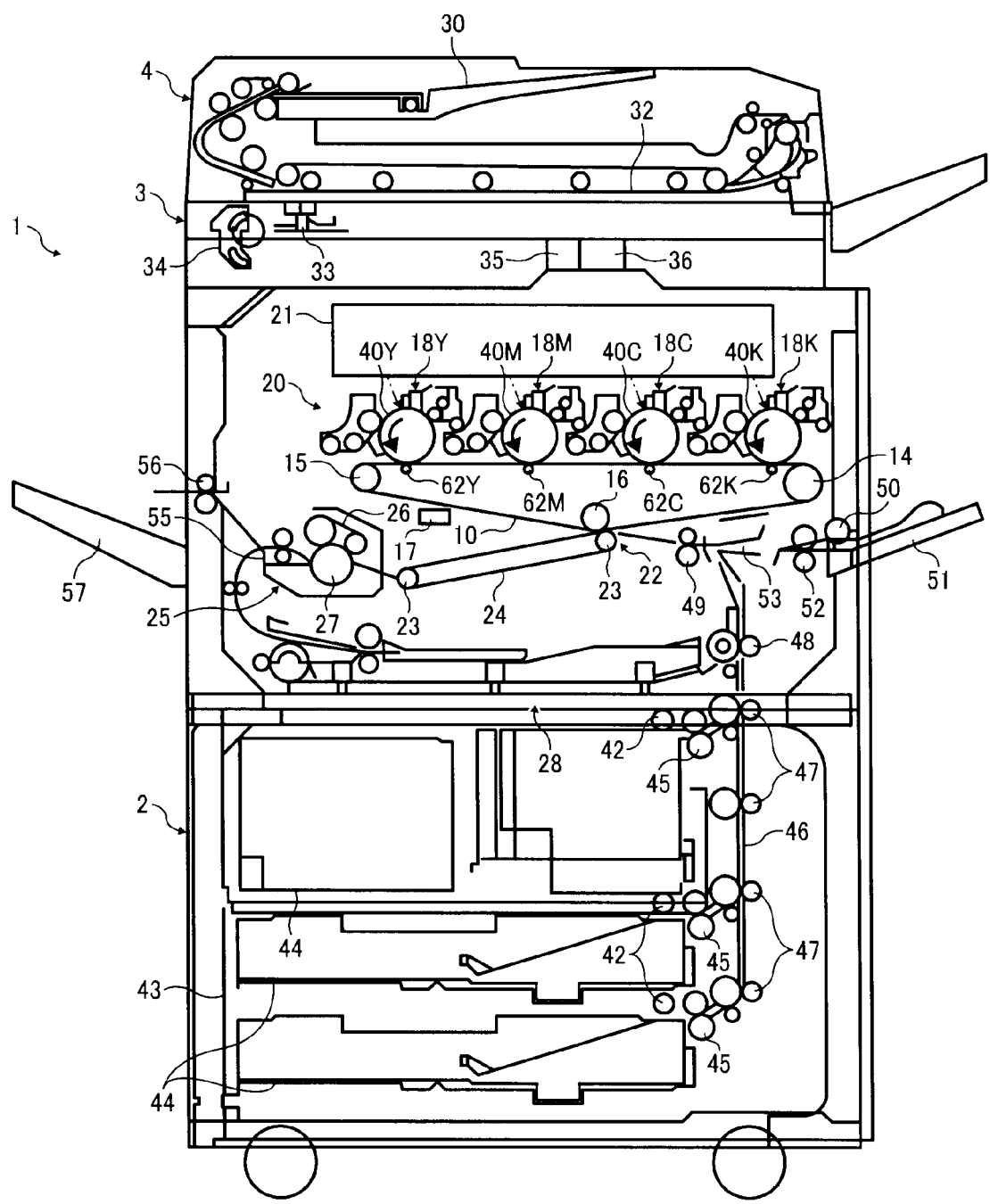
FIG. 1 illustrates a schematic configuration of an image forming apparatus according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, Operations, elements, and/or components, but do not preclude the presence or addition of one or more other features, integers, steps, Operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner.

Referring now to the drawings, a plurality of example embodiments is described for image forming apparatuses.

In conventional multi-beam writing unit, when the beam number is changed, unnecessary toner image may be formed, and various control steps may be required due to the change of beam number, and thereby an image forming efficiency may be degraded. In view of such situation, a method of preventing formation of unnecessary toner image, and suppressing the degradation of print speed is desired.

In example embodiments, during an image writing or forming operation, the number of light beams may be changed according to image forming line speed. Specifically, the number of light beams may be changed according to image forming line speed when forming a latent image using image data, wherein the number of light beams is changed by changing the number of channels of light sources such as for example laser diodes. In an image forming apparatus according to example embodiments, unnecessary activation of light source(s) can be prevented even when the beam number is changed, and switching time of image writing or forming operation caused by changed beam number can be reduced. In an image forming apparatus according to example embodiments, the number of light beams is changed at an image area, which means the number of activated light sources used for writing an image is changed, but a light intensity control is executed for all light sources at a blank area.

In an image forming apparatus according to example embodiments, synchronization detection for image writing may be conducted by emitting a light beam from a same light source in any cases such as when all light sources are activated for image writing, and when some light sources are activated for image writing while remaining other light sources are deactivated.

In an image forming apparatus according to example embodiments, when the number of activated light sources is changed (e.g., reduced), an image line corresponding to deactivated light source(s) is not formed, by which such line is not formed as image. In view of such effect, image-writing starting time is controlled in sub-scanning direction to prevent image position misalignment caused by the change of beam number.

FIG. 1 illustrates a schematic configuration of an image forming apparatus 1 according to first example embodiment. The image forming apparatus 1 may include a sheet feed unit 2, a scanner 3, and an automatic document feeder (ADF) 4, for example. The image forming apparatus 1 may include the sheet feed unit 2 at its lower portion, and the scanner 3 at its upper portion. The ADF 4 may be disposed on the scanner 3 to feed document to the scanner 3.

The image forming apparatus 1 may include an image forming unit 20 at its center portion. The image forming unit 20 may include an intermediate transfer unit 10 used as an endless belt. The intermediate transfer belt 10, extended by three support rollers 14, 15, 16, may rotate in a clockwise direction in FIG. 1. In first example embodiment, a belt cleaning unit 17 may be disposed near the second support roller 15 to remove toner remaining on the intermediate transfer belt 10 after an image transfer operation. Specifically, the belt-cleaning unit 17 may clean the intermediate transfer belt 10 after the intermediate transfer belt 10 passes over the second support roller 15.

Further, along a moving direction of the intermediate transfer belt 10 between the first support roller 14 and the second rollers 15, a set of the photoconductor 40 and image forming devices 18 is disposed for each of yellow (Y), magenta (M), cyan (C), and black (K) color, wherein the image forming devices 18 may include a charge unit, a development unit, a cleaning unit, or the like. The image forming unit 20 may include such photoconductors 40 and image forming devices 18, and the image forming unit 20 may be disposed detachably in the image forming apparatus. Further, the charge unit, the development unit, and the cleaning unit may be disposed with a given order around the photoconductor 40 to configure the process unit for each of colors. Reference characters of Y, M, C, K indicate yellow (Y), magenta (M), cyan (C), and black (K) color.

Further, an optical writing unit 21 may be disposed over the image forming unit 20. The optical writing unit 21 emits one or more laser beams onto the photoconductor 40 to write a latent image of each color onto the photoconductor 40 (i.e., image writing operation). Further, a secondary transfer unit 22 may be disposed under the intermediate transfer belt 10 while being faced to the third support roller 16 via the intermediate transfer belt 10. The secondary transfer unit 22 may include a secondary transfer belt 24, an endless belt, extended by first and second support rollers 14 and 15. The secondary transfer belt 24 may be pressed upward to push up the intermediate transfer belt 10 to the third support roller 16. The secondary transfer belt 24 is used to transfer an image on the intermediate transfer belt 10 to a recording sheet. Further, a primary transfer roller 62 is disposed inside of the intermediate transfer belt 10 to transfer an image formed on the photoconductor 40 onto the intermediate transfer belt 10.

Further, a fixing unit 25 may be disposed next to the secondary transfer unit 22 (or downstream of transport direction of recording sheet). The fixing unit 25 fixes a transferred toner image on the recording sheet, transported from the secondary transfer unit 22. The fixing unit 25 applies heat and pressure to the fixing belt 26 (e.g., endless belt) to fix an image on a recording sheet. Specifically, the fixing unit 25 includes a fixing belt 26 and a pressure roller 27, in which the fixing belt 26 may be heated and the pressure roller 27 is pressed to the fixing belt 26 to fix an image on a recording sheet.

Further, a sheet-reversing unit 28 may be disposed under the secondary transfer unit 22 and the fixing unit 25. The sheet-reversing unit 28 reverses faces of the recording sheet to form an image on both faces of the recording sheet. Specifically, right after an image is formed one face of recording sheet, the faces of the recording sheet are reversed in the sheet reversing unit 28 and then fed to the image forming unit 20 again to form an image on both faces of the recording sheet.

In such configured image forming apparatus, when a start switch on an operation unit is pressed, document can scanned by the scanner 3 used as a document image scanning unit. When a document sheet is placed on a document tray 30, the document may be fed from the ADF 4 to a contact glass 32. When document is placed on the contact glass 32, the document may be scanned by the scanner 3 using a first carriage 33 and a second carriage 34. In such scanning operation, a light source on the first carriage 33 emits light to the contact glass 32, and then a reflection light reflected from the document face is reflected by a first mirror on the first carriage 33 and then guided to the second carriage 34. The light is reflected on a mirror of the second carriage 34, and passes through a focus lens 35 to focus the light on a charge coupled device (CCD) 36 used as a image capture sensor. Primary color image data of Y, M, C, and K are generated based on image signals obtained by the CCD 36.

Further, when the start switch is pressed, when a personal computer instructs a color image production, or when a facsimile output function is activated, the intermediate transfer belt 10 is ready for starting rotation and each unit in the image forming unit 20 is ready for starting an image forming operation. When an image forming sequence is started, a laser beam, modulated based on primary color image data, is exposed to the photoconductor 40 to form a latent image on the photoconductor 40. The latent image is then developed on the photoconductor 40 as toner image of each of colors, and toner images of each of colors are superimposingly transferred on the intermediate transfer belt 10 to form one image. At a timing that a leading end of the toner image enters the secondary transfer unit 22, the recording sheet is fed into the secondary transfer unit 22 to transfer the toner image from the intermediate transfer belt 10 to the recording sheet. Then, the recording sheet is fed into the fixing unit 25 to fix the toner image on the recording sheet.

Further, the sheet feed unit 2 may include one or more feed rollers 42 and a sheet storage unit 43 including one or more sheet trays 44 that store a given volume of recording sheet. One of the feed rollers 42 is selectively rotated to take out a recording sheet from the sheet trays 44, such one recording sheet is separated from other sheets by a separation roller 45, and then feed to a sheet transport path. The separated recording sheet is then guided to a transport roller 47 and a transport route 46. The recording sheet is transported upward in the transport route 46, and guided to a transport roller unit 48 in the image forming apparatus 1. The recording sheet is abutted to a registration roller 49 in the transport roller unit 48, and stopped for some time. Then, as above described, the recording sheet is fed to the secondary transfer unit 22 by synchronizing a timing of transporting a leading side of toner image on the intermediate transfer belt 10 to the secondary transfer unit 22.

Instead of using the sheet feed unit 2, a manual tray 51 can be used to feed a recording sheet. For example, a user sets one or more recording sheets on the manual tray 51. When the manual tray 51 is selected for feeding sheet, a feed roller 50 is rotated to separate one sheet from the manual tray 51, and then the sheet is fed into a manual feed path 53 using a transport roller 52. The sheet is then is abutted to the registration roller, and stopped for some time. Then, the recording sheet is fed to the secondary transfer unit 22 by synchronizing a timing of transporting a leading side of toner image on the intermediate transfer belt 10 to the secondary transfer unit 22. Then, the fixing unit 25 fixed the toner image on the sheet, and the sheet is ejected.

The ejected recording sheet is guided to an ejection roller 56 via a switching claw 55, and then ejected to a sheet ejection tray 57 by the ejection roller 56, and stacked on the sheet ejection tray 57. When another image is to be formed on a back face of sheet, the recording sheet having an image on a front face of sheet is guided to the sheet-reversing unit 28 using the switching claw 55. The recording sheet is inverted in the sheet-reversing unit 28, and then guided to the image forming unit 20 to form an image on the back face of sheet. Then, the sheet is ejected on the sheet ejection tray 57 by the ejection roller 56.

After such image transfer operation, toner remaining on the intermediate transfer belt 10 may be removed by the belt-cleaning unit 17 to prepare the intermediate transfer belt 10 for a next image forming operation.

Figure 2:
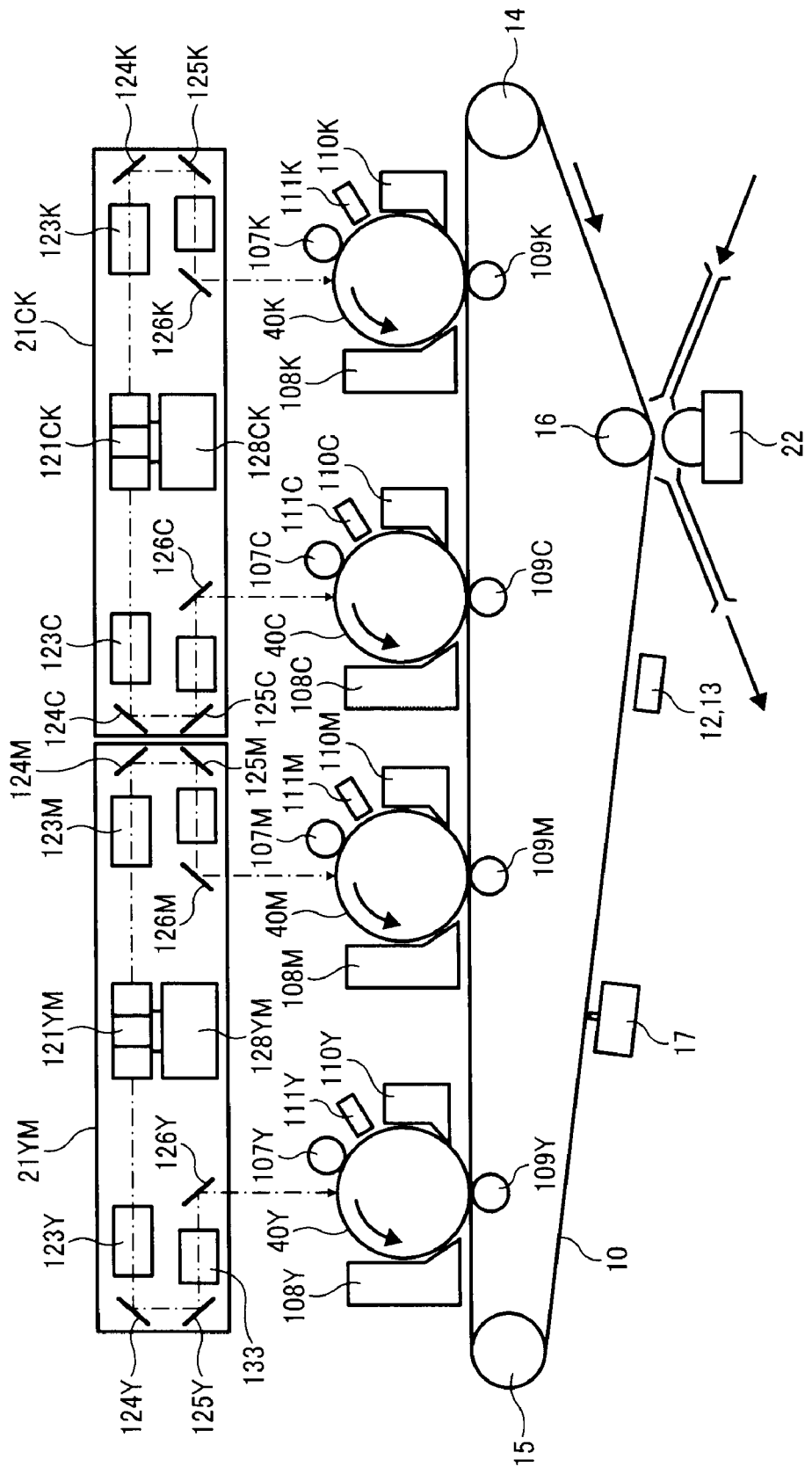
FIG. 2 illustrates a schematic configuration of an image forming unit of image forming apparatus of FIG. 1.
Figure 3:
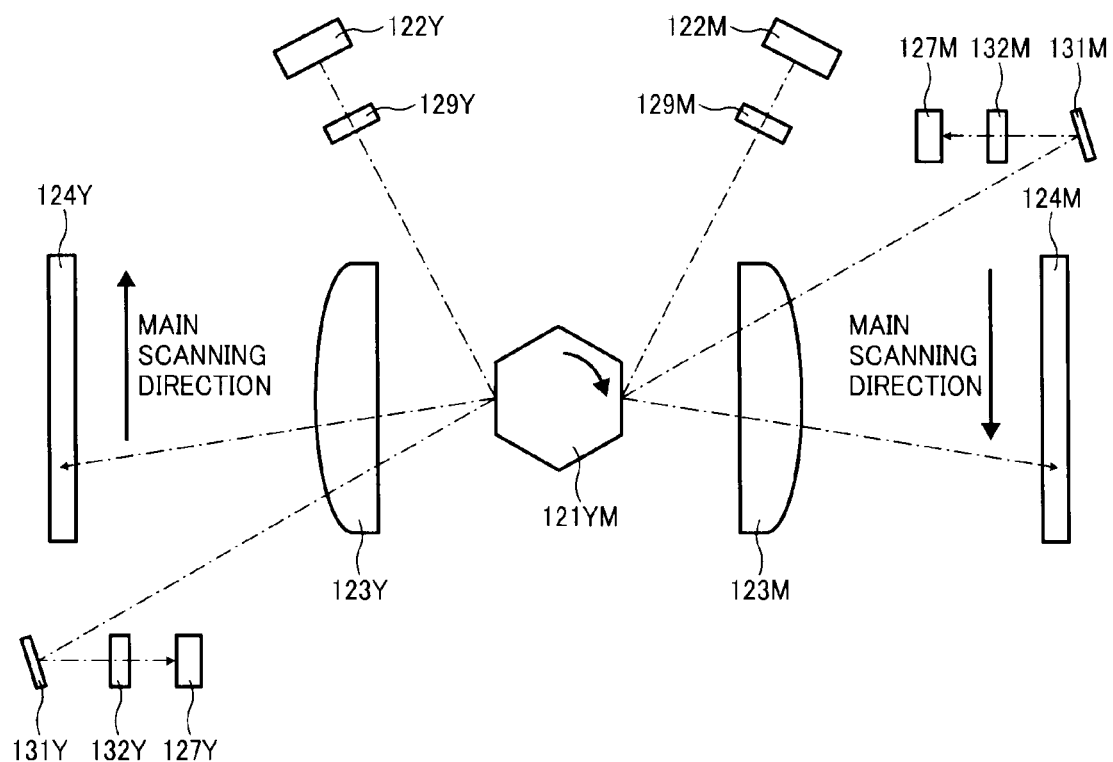
FIG. 3 illustrates a plan view of multi-beam writing unit of FIG. 2.

FIG. 2 illustrates a schematic configuration of image forming units of the image forming apparatus 1, and FIG. 3 illustrates a schematic plan view of the optical writing unit 21 of FIG. 2. As illustrated in FIG. 2, in the image forming apparatus 1, the image forming unit 20 may include four image forming engines, and first and second optical writing units 21YM and 21CK may be disposed to form color image formed by superimposing yellow Y, magenta M, cyan C, and black K images. As such, the optical writing unit 21 may be used as a light scanning unit, which scan a photoconductor to write a latent image on the photoconductor.

The first and second optical writing units 21YM and 21CK may have a same configuration. The first optical writing unit 21YM may use a polygon mirror 121YM, and the second optical writing unit 21CK may use a polygon mirror 121CK. Such polygon mirrors 121YM and 121CK may be used as a deflector to deflect light beams of each of colors using different mirror faces. Such deflected light beams may be used to scan photoconductors. The polygon mirrors 121YM and 121CK may be driven by polygon motors 128YM and 128CK. Specifically, the polygon mirror 121YM may be used to deflect two light beams using two opposed faces of the polygon mirror 121YM, and the polygon mirror 121CK may be used to deflect two light beams using two opposed faces of the polygon mirror 121CK. Such light beams may be used to scan surfaces of photoconductors 40Y, 40M, 40C, 40K. The light beams may be emitted from laser diode (LD) units 122Y, 122M, 122K, 122C (see FIG. 3) disposed for each of colors. The LD units 122Y, 122M, 122K, 122C emit light beams, which is generated by conducting light modulation based on image data. As such, the LD unit 122 can be used as a light source.

The light beams emitted from the LD unit 122Y, 122M, 122K, 122C are deflected by the rotating polygon mirrors 121YM and 121CK, and then travel as follows: passing through f-theta lenses 123Y, 123M, 123C, 123K; reflecting at first mirrors 124Y, 124M, 124C, 124K, and second mirrors 125Y, 125M, 125C, 125K; passing through barrel toroidal lens (BTL); reflecting at third mirrors 126Y, 126M, 126C, 126; scanning the photoconductors 40Y, 40M, 40C, 40K. The barrel toroidal lens BTL is used to focus the light beams in a sub-scanning direction and to correct position of the light beams in the sub-scanning direction such as optical face tangle error correction for laser scanning system in sub-scanning direction.

Further, as illustrated in FIG. 3, synchronization detectors 127Y and 127M may be disposed in the first optical writing unit 21YM to output synchronization detection signal to set a writing start timing in a main scanning direction. For example, the synchronization detectors 127Y and 127M may be disposed at a given position to receive the light beam deflected by the polygon mirror 121 to set a writing start timing in a main scanning direction. Such position may be set to a position, which is outside of image writing start-position in the main scanning direction. Although not illustrated in FIG. 3, synchronization detectors 127C, 127K may be disposed in the second optical writing units 21CK as similar to the synchronization detectors 127Y and 127M.

Each of the photoconductors 40Y, 40M, 40C, 40K may be respectively surrounded by chargers 107Y, 107M, 107C, 107K, development units 108Y, 108M, 108C, 108K, transfer units 109Y, 109M, 109C, 109K, cleaning units 110Y, 110M, 110C, 110K, and de-chargers 111Y, 111M, 111C, 111K. Using an electrophotography process including charging, exposing, developing, and transferring, first color image is formed on the intermediate transfer belt 10, and then second, third, fourth images are superimposingly transferred on the intermediate transfer belt 10 to form a color image having four color images.

Further, with an effect of the secondary transfer unit 22, the color image formed on the intermediate transfer belt 10 is transferred to a recording sheet. The color image is then fixed on the recording sheet by using the fixing unit 25 (see FIG. 1).

The belt-cleaning unit 17 is used to remove toner from the intermediate transfer belt 10. A first sensor 12 and a second sensor 13 may be disposed near the belt cleaning unit 17, which is a upstream side of belt rotation direction. The first sensor 12 and second sensor 13 may detect a correction pattern used for correcting image misalignment, formed on the intermediate transfer belt 10. The first and second sensors 12 and 13 may employ a reflection-type optical sensor. The first and second sensors 12 and 13 may detect a correction pattern used for correcting image misalignment formed on the intermediate transfer belt 10. Based on the detection result, a printer controller 201 may correct image position misalignment in main scanning direction and/or sub-scanning direction between each of colors, and image magnification error in main scanning direction.

Further, the printer controller 201 may include a central processing unit (CPU), a read only memory (ROM), and a random access memory (RAM). The CPU sets program codes stored in the ROM to the RAM, and uses the RAM as a working area and data buffer. Then, the CPU executes a program written by program codes to control processes image forming operation such as optical writing process, in which the photoconductor may be optically scanned, which is to be described later.

FIG. 3 illustrates a schematic plan view of a first optical writing unit YM of the optical writing unit 21, in which optical devices may be disposed with a given configuration. In FIG. 3, the light beam emitted from the LD unit 122Y passes through a cylinder lens (CYL) 129Y, and enters the polygon mirror 121YM. The rotating polygon mirror 121YM deflects the light beam, and then the light beam passes through an f-theta lens 123Y, and is reflected by a first mirror 124Y. The light beam emitted from the LD unit 122M travels in a similar manner except deflecting direction.

At an image-writing-starting side in a main scanning direction, a synchronization mirror 131Y, a synchronization mirror 131M, a synchronization lens 132Y, a synchronization lens 132M, a synchronization sensor 127Y, a synchronization sensor 127M may be disposed as illustrated in FIG. 3. The light beams passed through the f-theta lenses 123Y and 123M are respectively reflected by the synchronization mirror 131Y and the synchronization mirror 131M, respectively focused by the synchronization lens 132Y and the synchronization lens 132M, and respectively enter the synchronization sensor 127Y and the synchronization sensor 127M. As such, the synchronization sensors 127Y and 127M may detect the synchronization detection signal XDETP for image-writing-starting side. As illustrated in FIG. 3, light beam scanning directions may be opposite each other between yellow Y and magenta M. A second optical writing unit CK for cyan C and black K may also be configured with a similar manner.

Figure 4:
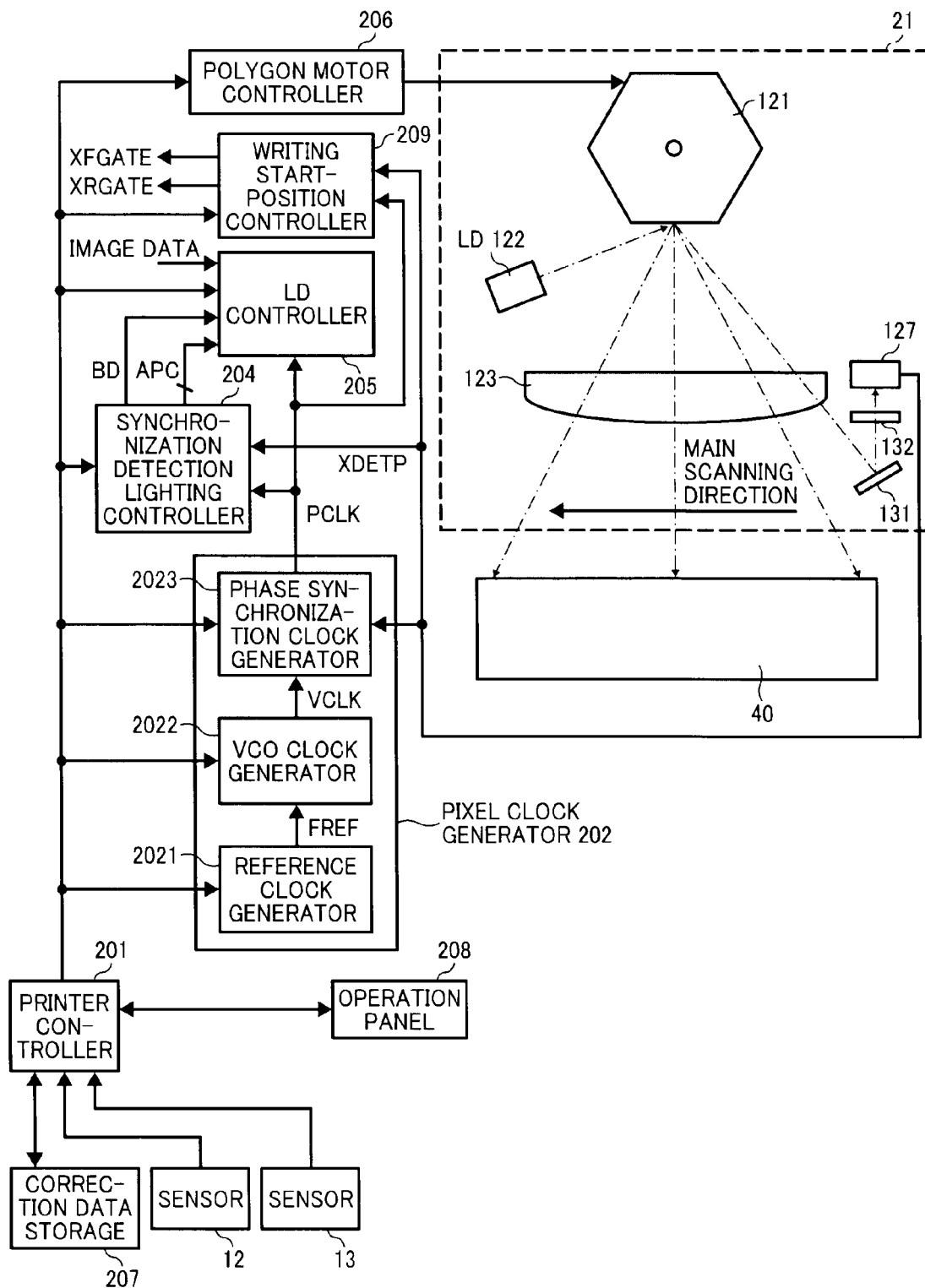
FIG. 4 illustrates a schematic configuration of image forming control system of multi-beam writing unit of FIG. 2.

FIG. 4 illustrates a schematic configuration of an optical writing unit and an image forming control unit set in the image forming apparatus 1, in which the optical writing unit 21 is used to scan the photoconductor 40. FIG. 4 illustrates a control system for the optical writing unit 21Y, M, C, K used with the photoconductor 40. Because the optical writing unit 21Y, M, C, K have a similar configuration, one optical writing unit 21 is illustrated in FIG. 4 as a representative unit. The control system may include the printer controller 201, a pixel clock generator 202, a synchronization detection lighting controller 204, a LD controller 205, a polygon motor controller 206, and a writing start-position controller 209. The printer controller 201 may be provided for just one for different colors, and other units may be for each of colors. Further, the pixel clock generator 202 may include a reference clock generator 2021, a voltage controlled oscillator (VCO) clock generator 2022, and a phase synchronization clock generator 2023. Further, the synchronization detector 127 may be disposed at one end of main scanning direction (or image writing starting end) for the optical writing unit 21 to detect a light beam. As above described, a light beam passed through the f-theta lens 123 is reflected by the mirror 131, then focused by the lens 132 to enter the synchronization detector 127. Further, the writing start-position controller 209 is input with an image-writing-start-side synchronization detection signal XDETP from the synchronization sensor 127, and a pixel clock PCLK from the pixel clock generator 202.

In such configured optical writing unit 21, the light beam enters the synchronization detector 127, then the synchronization detector 127 outputs image-writing-starting synchronization detection signal XDETP, and transmits the signal XDETP to each of the pixel clock generator 202, the synchronization detection lighting controller 204, and the writing start-position controller 209. The pixel clock generator 202 generates a pixel clock PCLK synchronized with the image-writing-starting synchronization detection signal XDETP, and transmits the pixel clock PCLK to the LD controller 205 and the synchronization detection lighting controller 204.

Figure 5:
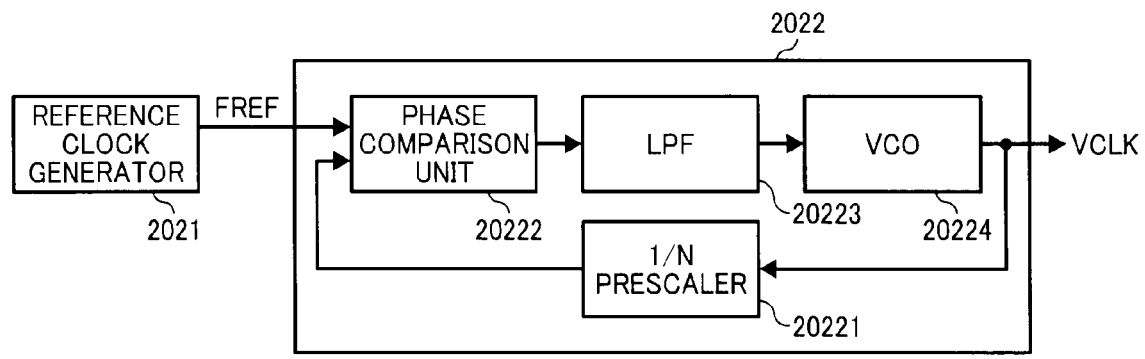
FIG. 5 illustrates a block diagram of VCO clock generator such as PLL circuit.

FIG. 5 illustrates a block diagram of the VCO clock generator 2022 using a phase locked loop (PLL) circuit. As shown in FIG. 5, in the VCO clock generator 2022, a reference clock signal FREF from the reference clock generator 2021, and a signal, which is obtained by prescaling the VCLK using a 1/N prescaler 20221, is input to a phase comparison unit 20222. The phase comparison unit 20222 conducts phase comparison at down edges of two signals, and output constant current based on error component. A low-path filter (LPF) 20223 removes unnecessary high frequency component and noise signal, and transmits the signal to the VCO 20224. The VCO 20224 outputs a signal having an oscillation frequency based on an output of the LPF 20223 to output the VCO clock (VCLK). Accordingly, by variably controlling a frequency of FREF from the printer controller 201 and the prescale ratio N, the frequency of VCLK can be changed.

In the phase synchronization clock generator 2023 (see FIG. 4), the pixel clock PCLK synchronized to the image-writing-starting synchronization detection signal XDETP is generated using VCLK generated by the VCO clock generator 2022.

To detect the image-writing-starting synchronization detection signal XDETP at first, the synchronization detection lighting controller 204 sets a compulsory activation signal BD to "ON" to activate the LD compulsory. Once the detection of image-writing-starting synchronization detection signal XDETP is started, the LD is activated with a timing that the image-writing-starting synchronization detection signal XDETP can be detect effectively without generating a flare light using the image-writing-starting synchronization detection signal XDETP and the pixel clock PCLK. When the image-writing-starting synchronization detection signal XDETP is detected correctly, the synchronization detection lighting controller 204 sets a compulsory deactivation signal to turn off the LD, and transmits the deactivation signal to the LD controller 205.

Figure 7:
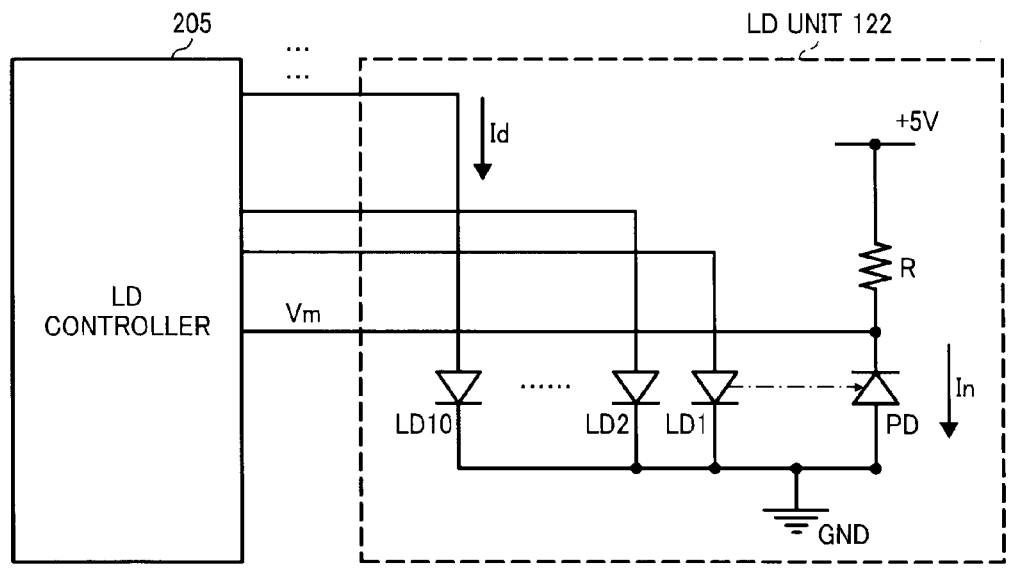
FIG. 7 illustrates a block diagram of LD controller and LD unit in a first example embodiment.

Further, the synchronization detection lighting controller 204 generates light intensity control timing signal for LDs using the image-writing-starting synchronization detection signal XDETP and the pixel clock PCLK. The light intensity control timing signal may be automatic power control (APC) signal (e.g., APC1 to APC10). Such signal needs to be executed at a blank area. Further, because the LDs are configured as shown in FIG. 7, the APC signal may need to be generated with different timing for each of LDs.

The LD controller 205 controls activation condition of LD based on the compulsory activation signal BD and image data synchronized to the pixel clock PCLK. The LD unit 122 emits a laser beam, which is deflected by a mirror face of the polygon mirror 121. Then, the laser beam passes through the f-theta lens 123, and scans the photoconductor 40. The polygon motor controller 206 controls rotation of the polygon motor 128 at a given rotation number based on a control signal from the printer controller 201.

Based on the image-writing-starting synchronization detection signal XDETP, the pixel clock PCLK, and a control signal of the printer controller 201, the writing start-position controller 209 generates a main scanning gate signal XRGATE and a sub-scanning gate signal XFGATE used to determine an image write-start timing and image width.

The first and second sensors 12 and 13, which detect the correction patterns used for correcting image misalignment, may employ a light reflection sensor. Pattern information detected by the first and second sensors 12 and 13 is transmitted to the printer controller 201. Based on the detected pattern information, the printer controller 201 computes image misalignment value (or amount), generates correction data, and stores the correction data to a correction data storage 207. The correction data storage 207 stores the correction data used to correct image position misalignment, and magnification error. Specifically, The correction data storage 207 stores data to determine a timing of using the image width gate signal XRGATE, data to determine a timing of using the sub-scanning gate signal XFGATE signal, and data to determine a frequency of the pixel clock PCLK, for example. Such correction data can be set to each of controllers with a command from the printer controller 201. A user can operate keys on an operation panel 208 to transmit an instruction to the printer controller 201, and the printer controller 201 can control units based such instruction. Further, the operation panel 208 may display information under control of the printer controller 201.

Figure 6:
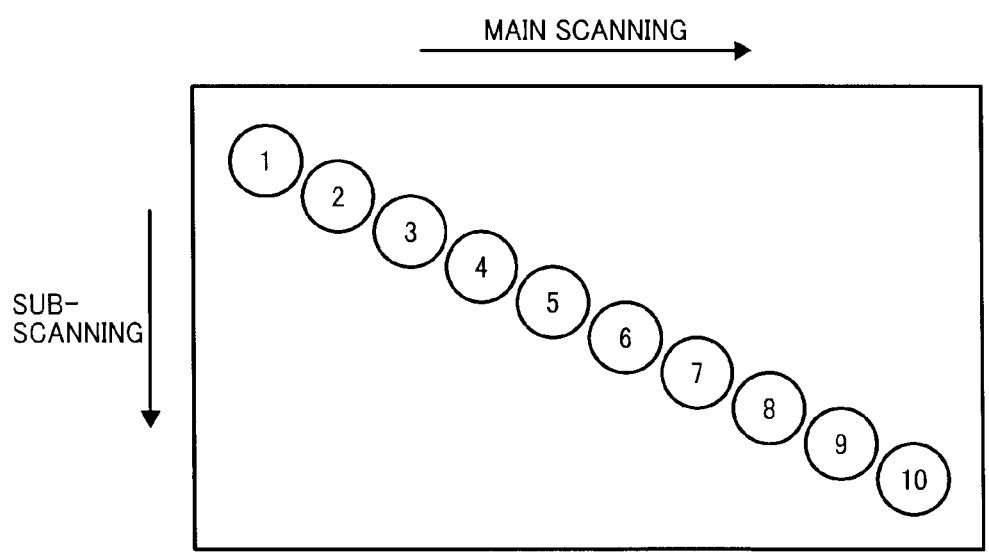
FIG. 6 illustrates an example arrangement pattern of light sources in a first example embodiment.

FIG. 6 illustrates an arrangement pattern of light sources such as laser diode (LD). In an example embodiment, the LD unit 122 may include ten LDs (LD1 to LD10) as light sources, and the ten light sources may be disposed as a LD array while shifting position of light sources in a main scanning direction and sub-scanning direction with a given pitch. In such a configuration, image forming can be conducted for ten (10) lines per one (1) scanning operation. In FIG. 6, the LD1 to LD10 are shown by dots attached with numbers 1 to 10.

FIG. 7 illustrates a block diagram of the LD unit 122. The LD unit 122 may include a laser diode (LD) and a photodiode (PD). In an example embodiment, the LD unit 122 includes ten LDs (LD1 to LD10), and one PD. The LD controller 205 controls LD current Id of each of LDs (LD1 to LD10) to maintain a monitor voltage Vm of PD at a constant value so that each of LDs (LD1 to LD10) can be activated with a given light intensity instructed by the printer controller 201, wherein such control may be called as auto power control (APC) operation. When to change the light intensity, the monitor voltage Vm is changed and set to a given constant value by an instruction from the printer controller 201. Then, the LD controller 205 controls LD current Id of each of LDs (LD1 to LD10) to maintain the monitor voltage Vm of PD at the given constant value. In example embodiment, the APC operation cannot be conducted for all LDs (LD1 to LD10) at one time because only one PD is used. Accordingly, the APC operation may be conducted at different timing for LDs (LD1 to LD10) with a given time.

Figure 8:
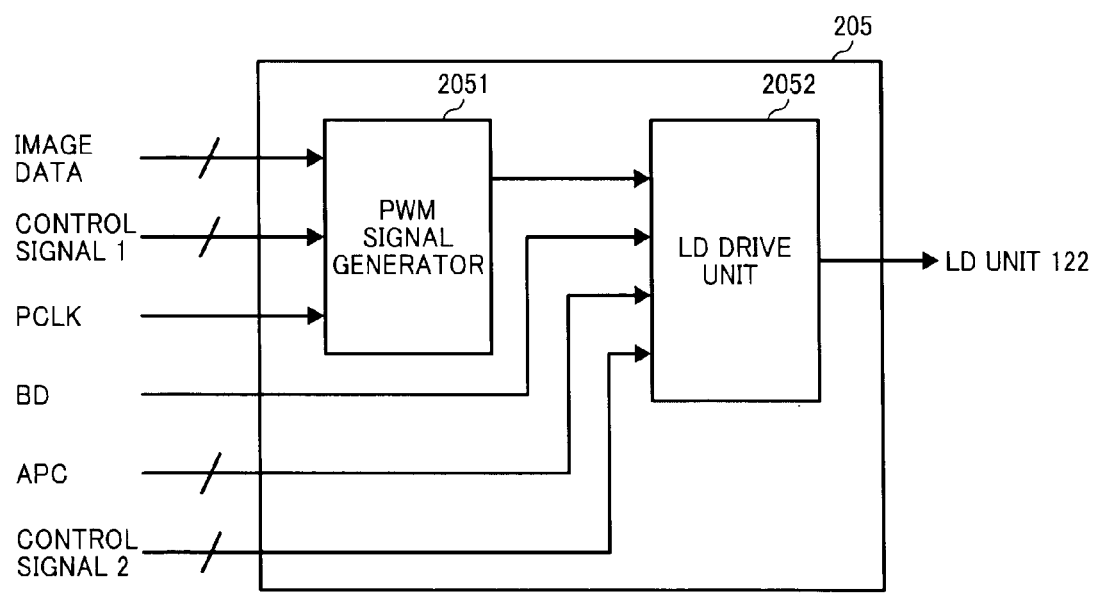
FIG. 8 illustrates a block diagram of LD controller.

FIG. 8 illustrates a block diagram of the LD controller 205. The LD controller 205 may include a pulse width modulation (PWM) signal generator 2051, and a LD drive unit 2052, for example. The PWM signal generator 2051 controls activation (or light-ON) time duration of each of LDs (LD1 to LD10). The LD drive unit 2052 controls activation/deactivation of each of LDs (LD1 to LD10). The PWM signal generator 2051 outputs a PWM signal to the LD drive unit 2052 based on received image data, and a control signal 1 from the printer controller 201. The LD drive unit 2052 can set the activated condition to each of LDs (LD1 to LD10) for the time duration set by the PWM signal.

The compulsory activation signal BD is transmitted from the synchronization detection lighting controller 204 to the LD drive unit 2052 to activate LD at a time duration corresponding to the compulsory activation signal BD. Further, a light intensity control timing signal (or APC signal) is transmitted from the synchronization detection lighting controller 204 to the LD drive unit 2052 to execute APC operation for each of LDs (LD1 to LD10). As such, light intensity of each of LDs (LD1 to LD10) can be controlled at a timing of APC signal. The light intensity for activated LDs (LD1 to LD10) can be set by a control signal 2, which is transmitted from the printer controller 201.

The image data may be 1-bit width or a plurality of bits width (2-bit width or more). For example, when 1-bit width is used, a pulse width set in advance may be generated, or a pulse width can be selected based on the control signal 1 (selection signal) from the printer controller 201. When a plurality of bits width (2-bit width or more) is used, a pulse width corresponding to each image data can be generated, or a pulse width can be selected based on a control signal 2 (selection signal) from the printer controller 201 to set a given pulse width corresponding to each image data.

Figure 9:
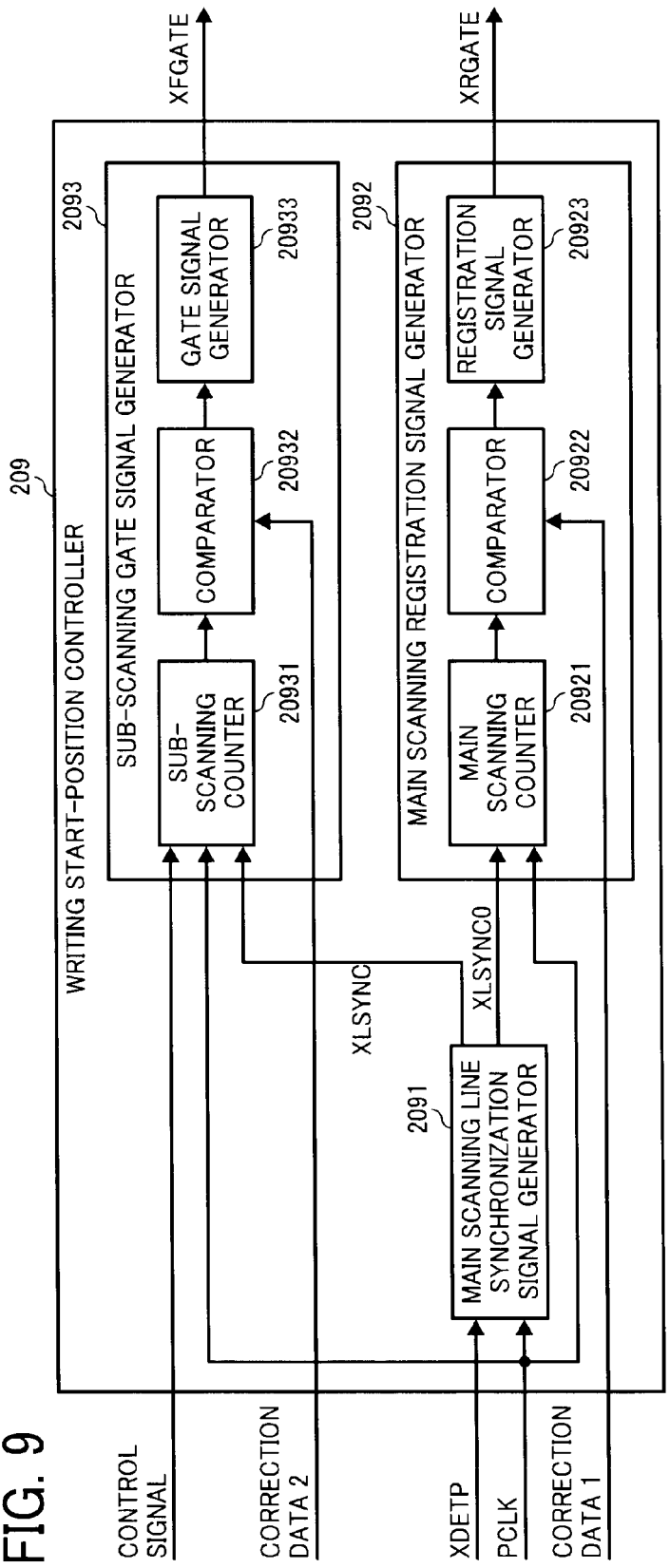
FIG. 9 illustrates a block diagram of writing start-position controller.

FIG. 9 illustrates a block diagram of the writing start-position controller 209. The writing start-position controller 209 may include a main scanning line synchronization signal generator 2091, a main scanning registration signal generator 2092, and a sub-scanning gate signal generator 2093. The main scanning registration signal generator 2092 may include a main scanning counter 20921, a comparator 20922, and a registration signal generator 20923. The sub-scanning gate signal generator 2093 may include a sub-scanning counter 20931, a comparator 20932, and a gate signal generator 20933.

The main scanning line synchronization signal generator 2091 generates a signal XLSYNC (or main scanning line synchronization signal) to activate the main scanning counter 20921 (in the main scanning registration signal generator 2092) and the sub-scanning counter 20931 (in the sub-scanning gate signal generator 2093).

The main scanning registration signal generator 2092 generates the main-scanning gate signal XRGATE used to determine an image data capturing timing such as image-write timing in main scanning direction. The sub-scanning gate signal generator 2093 generates the sub-scanning gate signal XFGATE to determine an image data capturing timing such as image-write timing in sub-scanning direction).

In the main scanning registration signal generator 2092, the main scanning counter 20921 is activated by XLSYNC and PCLK to output a counter value to the comparator 20922. The comparator 20922 compares the counter value from the main scanning counter 20921 and correction data 1 (or setting value) from the printer controller 201, and outputs a comparison result. The registration signal generator 20923 generates XRGATE based on the comparison result received from the comparator 20922.

In the sub-scanning gate signal generator 2093, the sub-scanning counter 20931 is activated by a control signal from the printer controller 201, XLSYNC from the main scanning line synchronization signal generator 2091, and pixel clock PCLK from the pixel clock generator 202 to output a counter value to the comparator 20932. The comparator 20932 compares the counter value from the sub-scanning counter 20931 and correction data 2 (or setting value) from the printer controller 201, and outputs a comparison result. The gate signal generator 20933 generates XFGATE based on the comparison result received from the comparator 20932.

The writing start-position controller 209 can correct a writing start-position in a main scanning direction per one cycle of PCLK (i.e., per 1 dot), and can correct a writing start-position in a sub-scanning direction per one cycle of XLSYNC (i.e., per 1 line). The correction data for main scanning direction and sub-scanning direction may be stored in the correction data storage 207.

Figure 10:
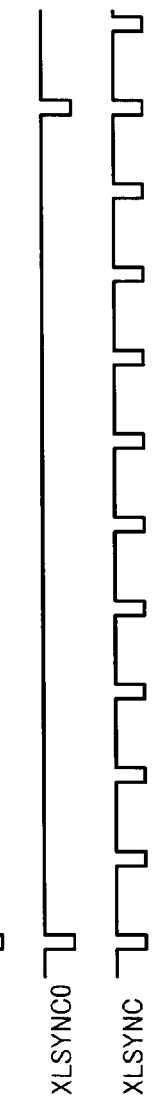
FIG. 10 illustrates a timing chart of output timing of main scanning line synchronization signal.

FIG. 10 illustrates a timing chart of output timing of main scanning line synchronization signal. In an example embodiment, the LD unit 122 can write image data for ten (10) beams per one (1) scanning operation. Accordingly, in one cycle of the image-writing-starting synchronization detection signal XDETP, the main scanning line synchronization signal XLSYNC is output 10 times.

FIG. 11 illustrates a timing chart for output timing of PCLK, XDETP, XLSYNC, XFGATE, main scanning counter, XRGATE, and image signal for the writing start-position controller 209 in a main scanning direction. As illustrated in FIG. 11, the main scanning counter 20921 is reset by XLSYNC, and counted up by PCLK. The main scanning counter 20921 outputs a counter value to the comparator 20922. The comparator 20922 compares the counter value and setting value 1. When the counter value becomes a value "X" (see FIG. 11) set by the printer controller 201, the comparator 20922 outputs a comparison result of the counter value (i.e. "X") to the registration signal generator 20923. The setting value 1 may be a correction data 1 used for correcting image misalignment in a main scanning direction. Then, the XRGATE signal becomes effective. The XRGATE signal is effective for image area in the main scanning direction when XRGATE signal is at Low (L) level.

FIG. 12 illustrates a timing chart for output timing of control signal, XLSYNC, sub-scanning counter, XFGATE, and image signal for the writing start-position controller 209 in a sub-scanning direction. As illustrated in FIG. 12, the sub-scanning counter 20931 is reset by a control signal (i.e., image writing start trigger signal) from the printer controller 201, and counted up by XLSYNC. The sub-scanning counter 20931 outputs a counter value to the comparator 20932. The comparator 20932 compares the counter value and setting value 2. The setting value 2 may be a correction data 2 used for correcting image misalignment in a sub-scanning scanning direction. When the counter value becomes a value "Y" (see FIG. 12) set by the printer controller 201, the comparator 20932 outputs a comparison result of the counter value (i.e. "Y") to the gate signal generator 20933. Then, the XFGATE signal becomes effective. The XFGATE signal is effective for image area in the sub-scanning direction when XFGATE signal is at Low (L) level.

Figure 13:
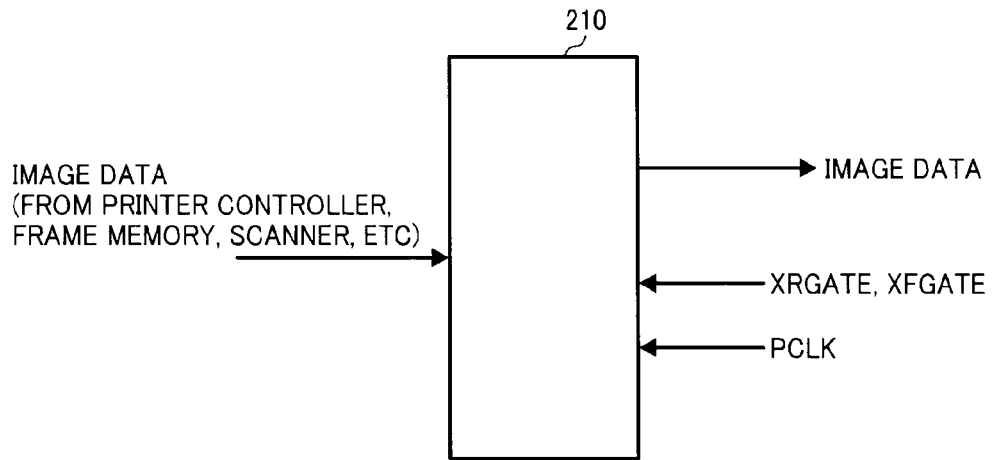
FIG. 13 illustrates a line memory disposed in image forming control system to output image data to a LD controller.

FIG. 13 illustrates a line memory 210 disposed for the LD controller 205 in the image forming control system. Specifically, the LD controller 205 may receive image data from the line memory 210. The line memory 210 may receive image data from a printer controller, a frame memory, a scanner, which have captured image data, and then the line memory 210 may output image data (or signal) corresponding to the number of beams at XFGATE/XRGATE timing while synchronizing with PCLK. The output image data is transmitted to the LD controller 205, and each of LDs (LD1 to LD10) can be activated at receiving timing of such data.

Figure 14:
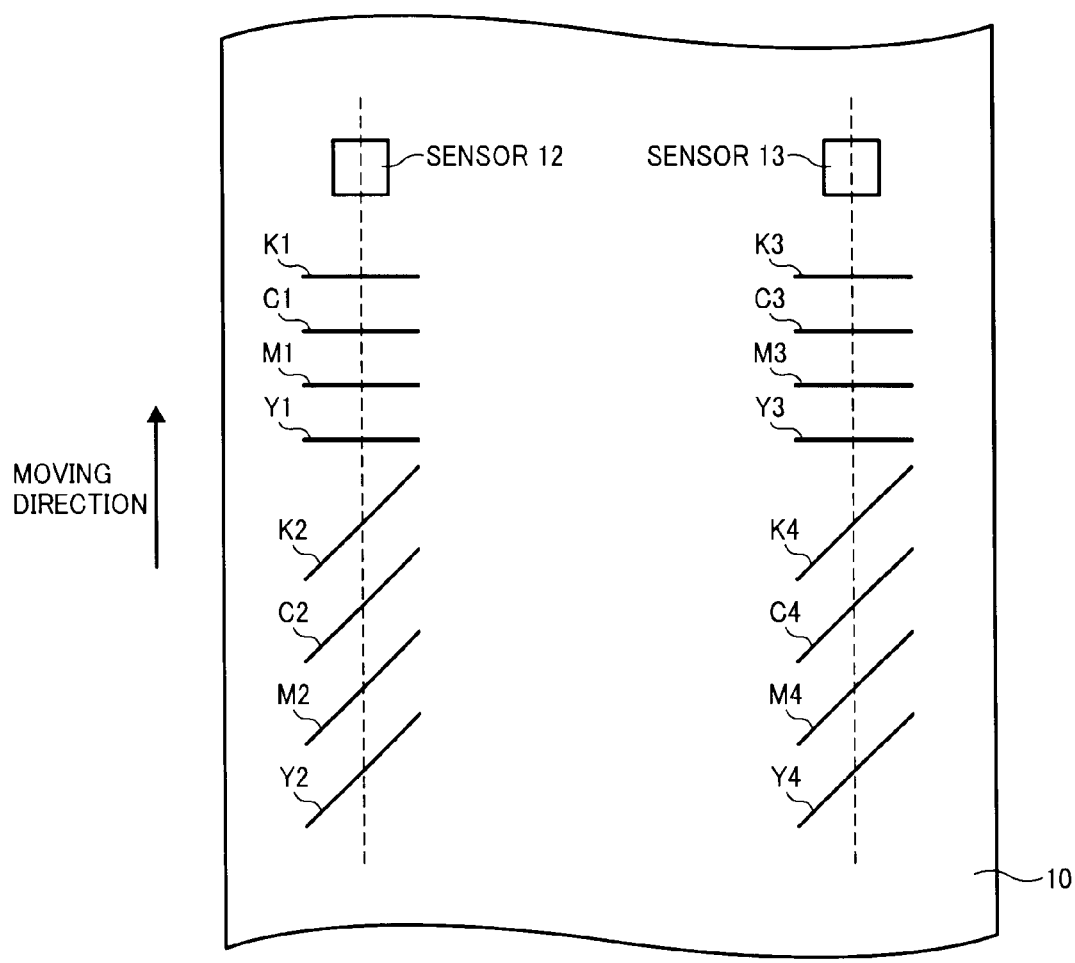
FIG. 14 illustrates correction patterns used for correcting image misalignment formed on an intermediate transfer belt, and sensors.

FIG. 14 illustrates correction patterns used for correcting image misalignment formed on the intermediate transfer belt 10 and sensors. The first and second sensors 12 and 13 may detect the correction patterns used for correcting image misalignment (e.g., straight pattern and slanted patterns) formed on the intermediate transfer belt 10. Based on the detection results, the printer controller 201 corrects image position misalignment between each of colors in main scanning direction, sub-scanning direction and magnification error. The correction pattern may be referred as "correction pattern" or "correction patterns." As illustrated in FIG. 14, the correction pattern used for correcting image misalignment may be formed in sub-scanning direction with a given timing (or interval). The correction pattern has a given length in main scanning direction. The correction pattern includes straight patterns K1, C1, M1, Y1, K3, C3, M3, Y3, and slanted patterns K2, C2, M2, Y2, K4, C4, M4, Y4 at both side of the intermediate transfer belt 10. The straight patterns may extend in a direction perpendicular to a moving direction of the intermediate transfer belt 10. The slanted patterns may extend in a direction slanted from a moving direction of the intermediate transfer belt 10. The slanted patterns K2, C2, M2, Y2, K4, C4, M4, Y4 may slated in 45 degrees in sub-scanning direction with respect to the moving direction of the intermediate transfer belt 10a (or width direction of the intermediate transfer belt 10). The first sensor 12 may detect the correction patterns K1, C1, M1, Y1, K2, C2, M2, Y2, and the second sensor 13 may detect the correction pattern K3, C3, M3, Y3, K4, C4, M4, Y4.

When the intermediate transfer belt 10 moves in a direction shown by an arrow, the first and second sensors 12 and 13 may detect the straight patterns K1, C1, M1, Y1, K3, C3, M3, Y3, and the slanted patterns K2, C2, M2, Y2, K4, C4, M4, Y4. Based on the detection of such patterns, the printer controller 201 can compute misalignment value (or time) for each of colors with respect to pattern K. Detection timing of the slanted patterns may deviate by image misalignment in main scanning direction and image magnification error. Detection timing of the straight patterns may deviate by image misalignment in sub-scanning direction.

Specifically, as for main scanning direction, a time interval between the patterns K1 and K2 is set as a reference time, and the reference time is compared with a time interval between the patterns C1 and C2 to compute a misalignment value "TKC12" between K and C. Further, a time interval between the patterns K3 and K4 is set as a reference time, and the reference time is compared with a time interval between the patterns C3 and C4 to compute a misalignment value "TKC34" between K and C. Then, magnification error of cyan C image with respect to black K image can be computed as "TKC34−TKC12." Based on such computed error, frequency of the pixel clock may be changed and corrected for such computed error. Such frequency change of pixel clock frequency may change the misalignment value "TKC12" at the image-writing-starting side because frequency change of pixel clock frequency may change an image position. Such changed amount is computed, and then the changed amount is subtracted from the TKC12 to obtain an image misalignment value of cyan C image with respect to black K image in main scanning direction. The image-writing starting time is set in view of such image misalignment value of cyan C to black K. Based on such computed misalignment value, an output timing of XRGATE signal, which determines image writing starting time is changed. Similar computing can be applied for magenta M and yellow Y.

As for sub-scanning direction, an ideal time interval is set as Tc, a time interval between the patterns K1 and C1 is set as TKC1, and a time interval between the patterns K3 and C3 is set as TKC3. Then, misalignment in sub-scanning direction of cyan C image with respect to black K image can be computed as "((TKC3+TKC1)/2)−Tc." Based on such computed misalignment value, an output timing of XFGATE signal, which determines image-writing starting time, can be changed. Similar computing can be applied for magenta M and yellow Y.

Figure 15:
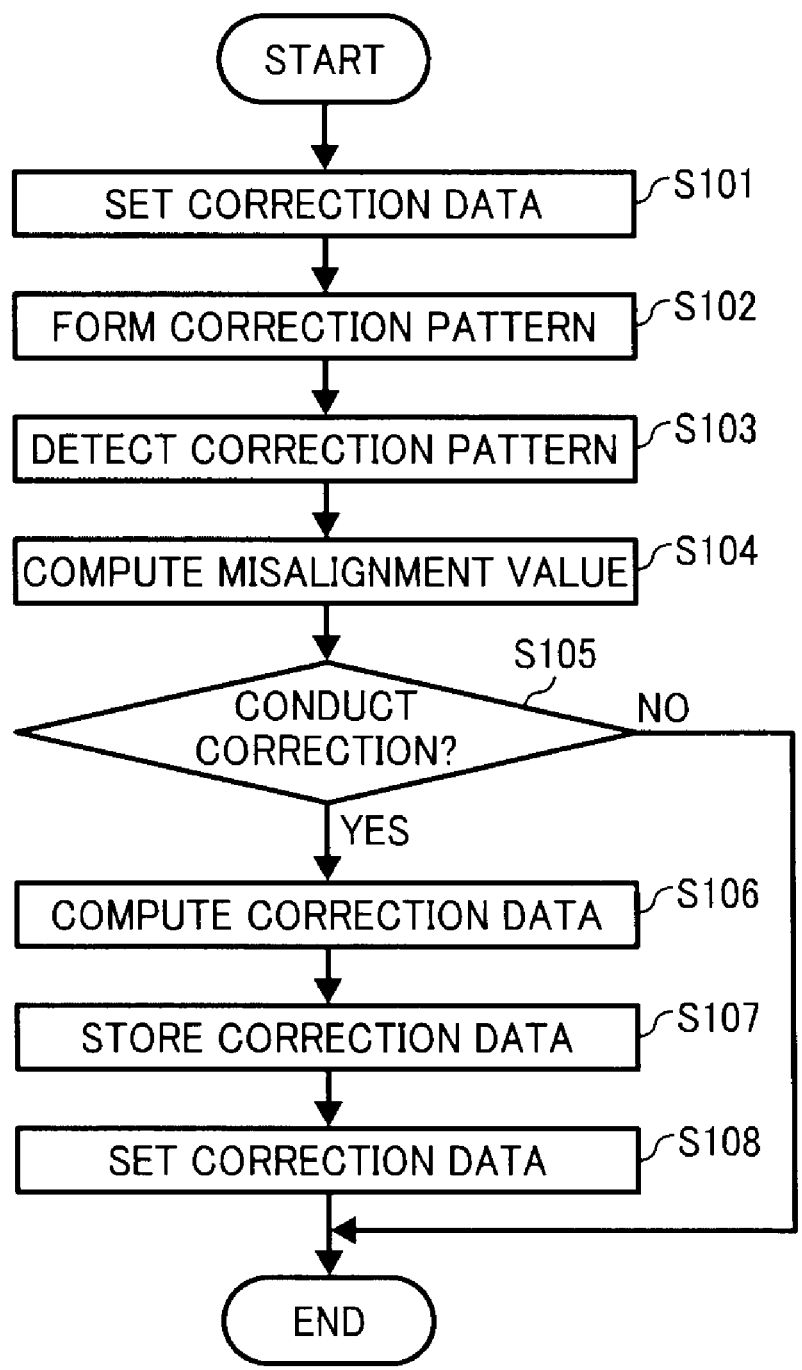
FIG. 15 illustrates a flowchart of image position misalignment correction process using correction patterns of FIG. 14.

FIG. 15 illustrates a flowchart of correction process for image misalignment. Such correction process of image misalignment may be conducted at a given timing. For example, the printer controller 201 conducts a correction process at a given timing such as when a given volume of sheets is printed, before starting a printing operation, or when power is supplied, for example. In the correction process, correction data stored in the correction data storage 207 is set in each controller (step S101). Such correction data may be obtained during the most recently conducted correction process of image position misalignment for correcting image position in main scanning direction, for correcting image position in sub-scanning direction, and for correcting image magnification ratio in main-scanning direction. If no correction process is yet conducted, a default value may be used.

After setting the correction data at step S101, the correction pattern of FIG. 14 is formed on the intermediate transfer belt 10 (step S102). The correction pattern is used for detecting and correcting image misalignment. The first and second sensors 12 and 13 detect the correction pattern (step S103). The printer controller 201 computes misalignment value of Y, M, C colors with respect to black K (step S104). Then, it is determined whether a correction is to be conducted (step S105).

The determination is conducted whether the misalignment value is one-half or more of correction resolution, for example. The correction resolution is a minimum unit that is correctable. For example, if one dot is formed with a resolution of 600 dots per inch (dpi), one dot becomes about 42 then the one-half of correction resolution may be set to 0.5 dot (21 μm for 600 dpi).

If the misalignment is one-half or more of correction resolution, it is determined to conduct a correction process (step S105: Yes), and correction data is computed (step S106). The correction data is then stored (step S107), and the correction data is set to each controller such as the printer controller 201 (step S108). The correction data may be a given value set for pixel clock frequency for determining image magnification in main scanning direction; a given value set for XRGATE signal for determining image misalignment in main scanning direction; and a given value set for XFGATE signal for determining image misalignment in sub-scanning direction. If it is determined not to conduct a correction process (step S105: No), the correction data is not updated. After such process, an image forming operation such as printing operation may be conducted using such correction data.

Figure 16:
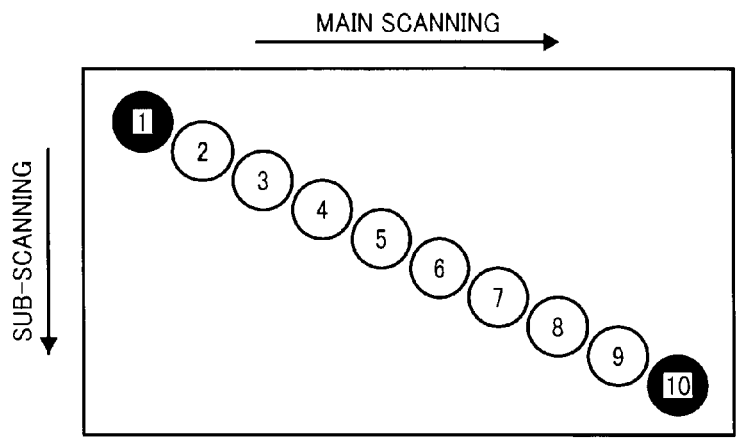
FIG. 16 illustrates an example activated/deactivated condition of light sources (LD1 to LD10) used for image forming at 80% image forming line speed.

FIG. 16 illustrates an example activation/deactivation condition of light sources (LD1 to LD10) used for an image forming operation at 80% image forming line speed. When 100% image forming line speed is used, all ten light sources (LD1 to LD10) shown in FIG. 6 are activated. When 80% image forming line speed is used, eight LDs (LD2 to LD9) are activated using image data without changing the rotation number of polygon motor 128 while not activating two LDs of LD1 and LD10. As such, eight LDs of ten LDs are activated for writing image data. As such, the LD1 (first LD) and LD10 (last LD) are not activated, but other LDs (LD2 to LD9) are activated in one LD array to write image data when 80% image forming line speed is used.

Figure 17:
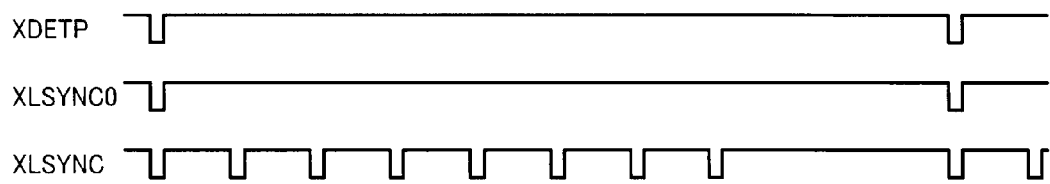
FIG. 17 illustrates a timing chart of output timing of XDETP, XLSYNC0, XLSYNC to set activated/deactivated condition for light sources of FIG. 16.

FIG. 17 illustrates a timing chart of output timing of XDETP, XLSYNC0, and XLSYNC for setting activation/deactivation condition for LDs shown in FIG. 16. As illustrated in FIG. 17, because image data for eight beams is written by one (1) scanning operation, the main scanning line synchronization signal XLSYNC is output for eight (8) times per one cycle of the image-writing-starting synchronization detection signal XDETP, in which image data of (8) lines is output per one scanning (or writing) operation.

Figure 18:
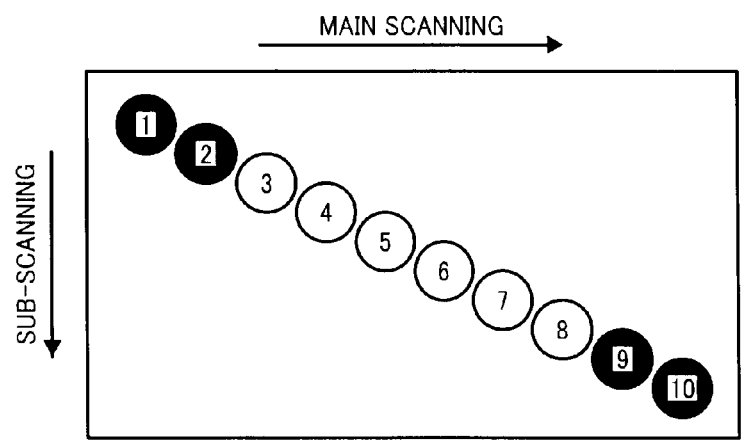
FIG. 18 illustrates an example activated/deactivated condition of light sources (LD1 to LD10) used for image forming at 60% image forming line speed.

FIG. 18 illustrates activated/deactivated condition of light sources (LD1 to LD10) used for an image forming operation at 60% image forming line speed. When 100% image forming line speed is used, all ten light sources (LD1 to LD10) shown in FIG. 6 are activated. When 80% image forming line speed is used, eight light sources (LD2 to LD9) are activated. When 60% image forming line speed is used, six LDs (LD3 to LD8)

are activated using image data without changing the rotation number of polygon motor 128 to write image data while not activating LD1, LD2, LD9, and LD10.

Figure 19:
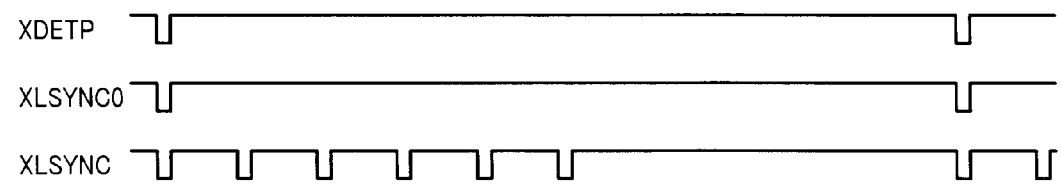
FIG. 19 illustrates a timing chart of output timing of XDETP, XLSYNC0, XLSYNC to set example activated/deactivated condition for light sources of FIG. 18.

FIG. 19 illustrates a timing chart of output timing of XDETP, XLSYNC0, and XLSYNC for setting activated/deactivated condition for LDs shown in FIG. 18 when 60% image forming line speed is used. As illustrated in FIG. 19, because image data for six beams is written by one (1) scanning operation, the main scanning line synchronization signal XLSYNC is output for six (6) times per one cycle of the image-writing-starting synchronization detection signal XDETP, in image data for six (6) lines is output per one scanning (or writing) operation.

Figure 20:
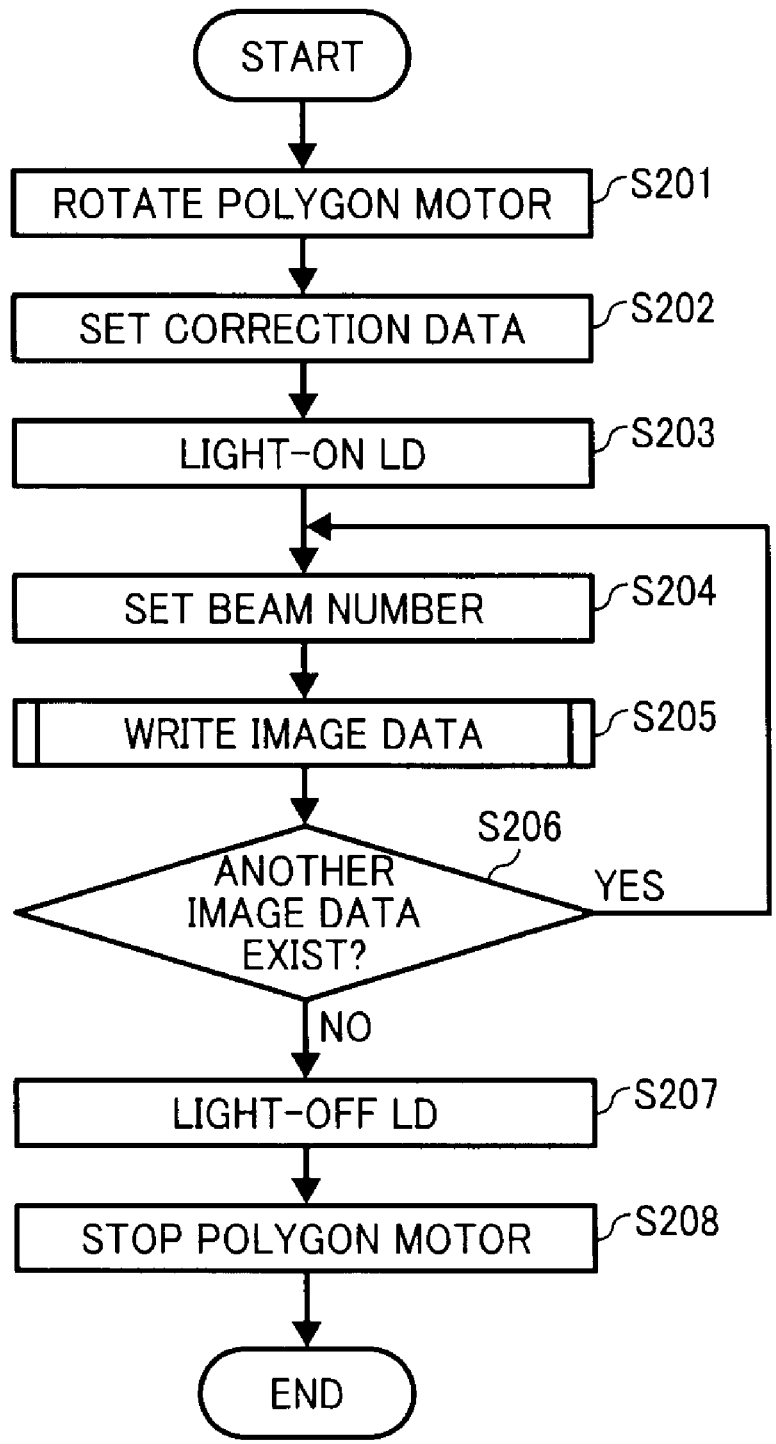
FIG. 20 illustrates a flowchart of image position misalignment correction process at reduced image forming line speed without changing rotation number of polygon motor.

FIG. 20 illustrates a flowchart of correction process for image position misalignment, in which image forming line speed is decreased without changing the rotation number of polygon motor 128. In such process, the polygon motor 128 is rotated at a given rotation number (step S201), and the correction data stored in the correction data storage 207 is set to each controller such as printer controller 201 (step S202). Such correction data may be obtained during the most recently conducted correction process of image position misalignment for correcting image position in main scanning direction, for correcting image position in sub-scanning direction, and for correcting image magnification ratio in main-scanning direction. If no correction process is yet conducted, a default value may be used.

After setting the correction data at step S202, LD is activated to output a synchronization detection signal, and an APC operation is conducted to set light intensity of activated LD at a given light intensity (step S203). Then, the beam number is set to a given value depending on an image forming line speed (step S204). For example, the beam number is set to ten (10) beams for the normal image forming line speed; 8 beams for 80% image forming line speed; and 6 beams for 60% image forming line speed.

Then, image data is written using the set beam number (step S205). If another image data exist for image forming operation (step S206: YES), the process goes to step S204 to set the beam number for another image data. If the image forming line speed is not changed for another image data, the beam number is not changed; if the image forming line speed is changed for another image data, the beam number is changed depending on the image forming line speed. Typically, an image writing operation on same sheets is conducted using a same beam number. For example, when an image writing or forming operation is conducted using sheets of same type, the image forming line speed may be set to a same value when such sheets are used. When a sheet type is changed, the image forming line speed may be changed depending on the sheet type. The sheet type may mean plain paper, thick paper, overhead projector (OHP) sheet, or the like. When different sheet types are used for one job, the image forming line speed may be changed during the one job.

If not another image data does not exist (step S206: NO), the LDs are deactivated (step S207), and the polygon motor 128 is stopped (step S208), and the process ends.

In an example embodiment, ten (10) beams may be used, but the beam number is not limited thereto. The greater the beam number, the more faster image forming line speed can be set. For example, in a second example embodiment to be described later, a writing head using VCSEL can use 20 beams for one image writing operation.

Figure 21:
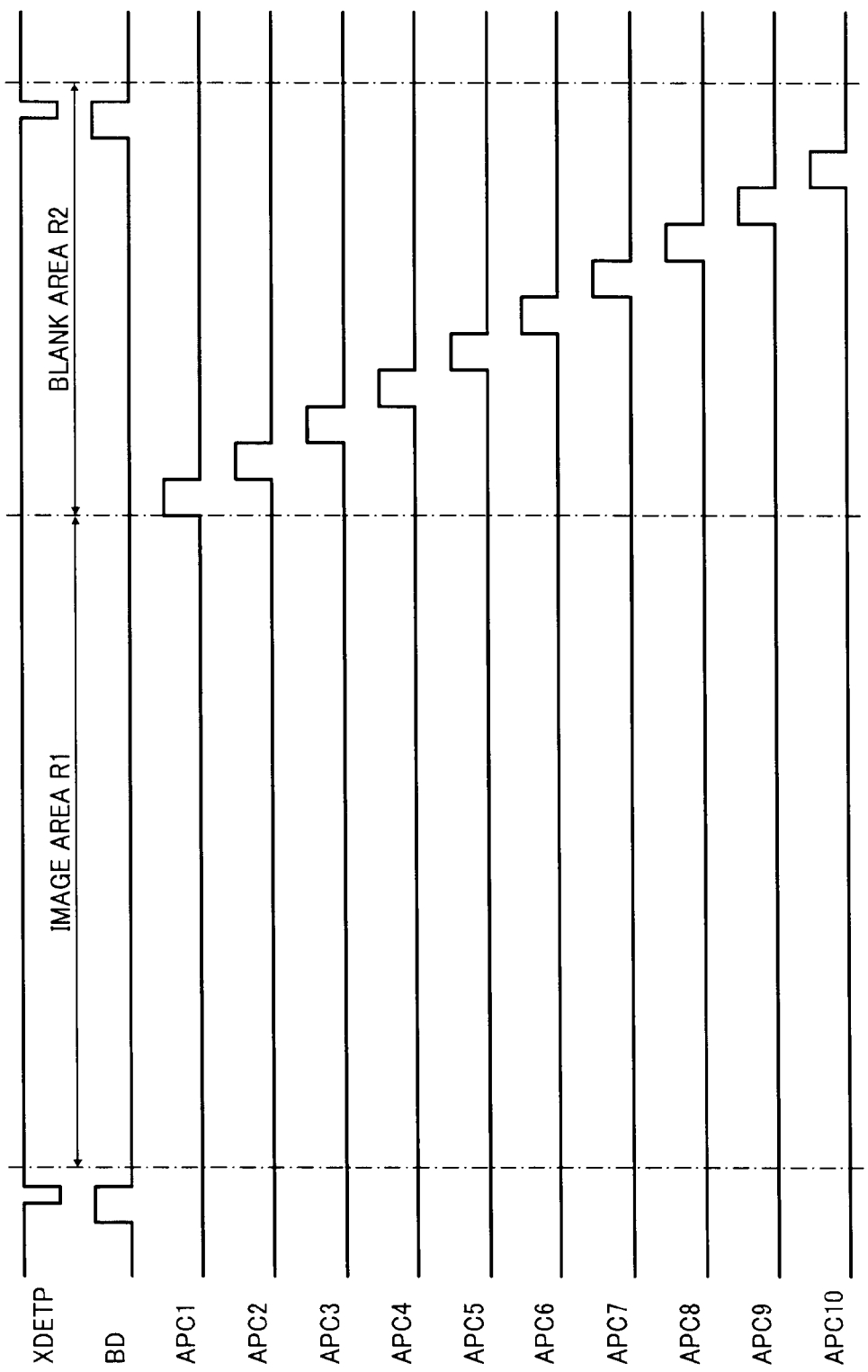
FIG. 21 illustrates a timing chart of APC operation, which is executed for light intensity control.

Further, at step S203, the APC operation may be conducted to set light intensity of activated LD at a given value. FIG. 21 illustrates a timing chart of APC operation timing for light intensity control. The APC operation for controlling light intensity at a given light intensity needs activated light source, wherein the APC operation may be executed at a blank area R2. Further, because one PD is used to check or monitor light intensity of LDs (see LD1 to LD10 in FIG. 7), APC signals may be used at different timing for each of LDs as shown in FIG. 21. FIG. 21 illustrates a case using ten (10) beams, but similar APC operation can be conducted for the beam number having other number, in which the APC operation is conducted for all LDs without relevance to activation/deactivation condition set for all LDs at an image area.

The synchronization detection lighting controller 204 outputs light intensity control timing signal such as APC signal (APC1 to APC10) to each of LDs using the mage-write-starting synchronization detection signal XDETP and the pixel clock PCLK, and executes APC operation for LD1 to LD10 at the blank area R2.

When the 80% image forming line speed is used, LD1 and LD10 are not activated at image area R1, but set to activated (or light-ON) at the blank area R2 with other LD2 to LD9 for one scanning line. When the 60% image forming line speed is used, LD1, LD2, LD9, LD10 are not activated at image area R1, but activated (or light-ON) at the blank area R2 with other LD3 to LD8 for one scanning line. Such light control operation may be executed for a next scanning line, which means such light control operation may be conducted for each scanning line. When the 80% or 60% image forming line speed is returned to the 100% image forming line speed when a sheet type is changed, light intensity of LD1 and LD10 (deactivated at 80%) or light intensity of LD1, LD2, LD9, LD10 (deactivated at 60%) can be activated at a same level of other LDs because the APC operation is already conducted as above described in the most-recent pervious scanning line.

Figure 22:
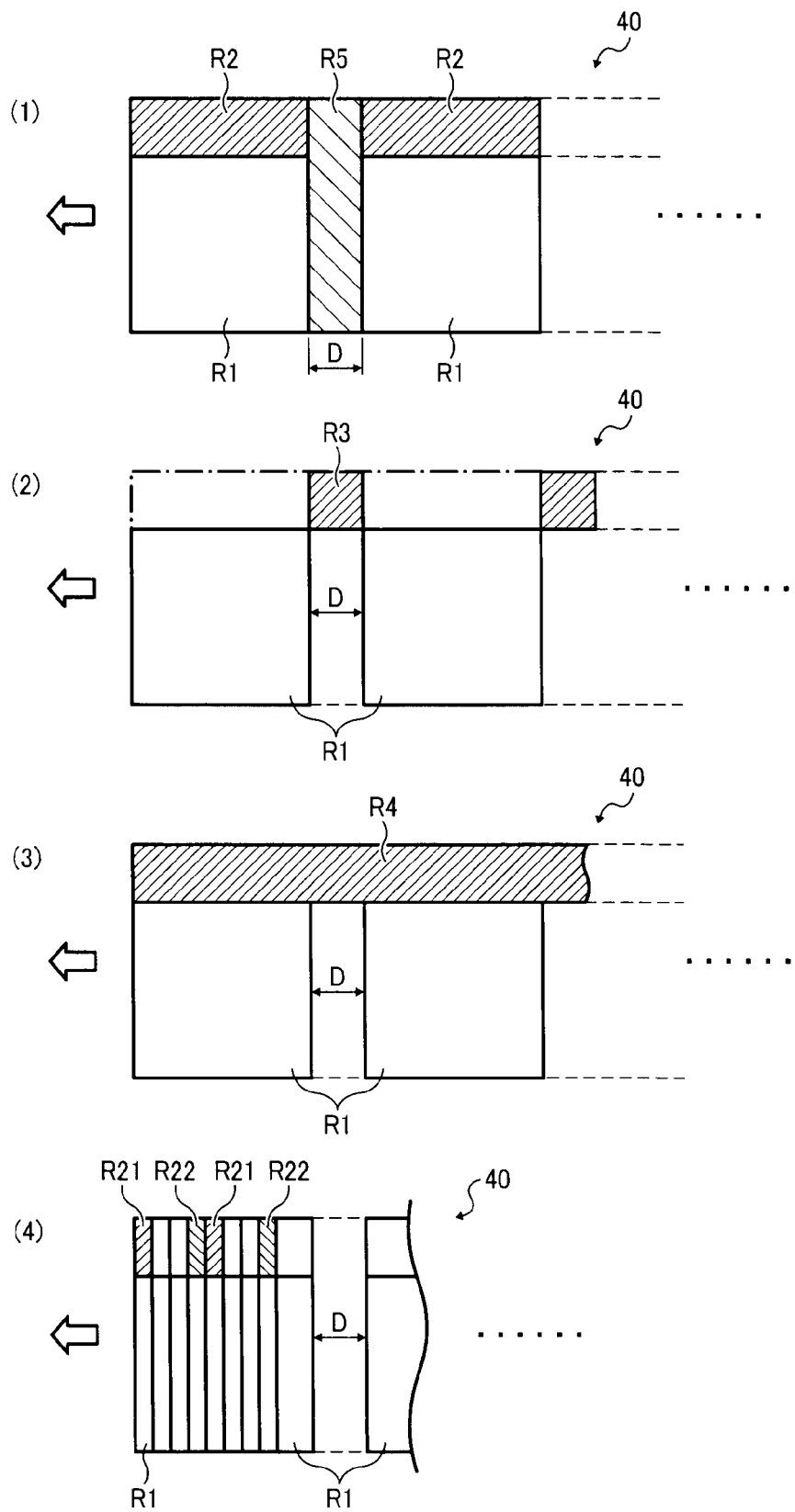
FIGS. 22(1)-22(4) illustrate an exploded view of photoconductor, in which an image area and blank area are indicated.
Figure 23:
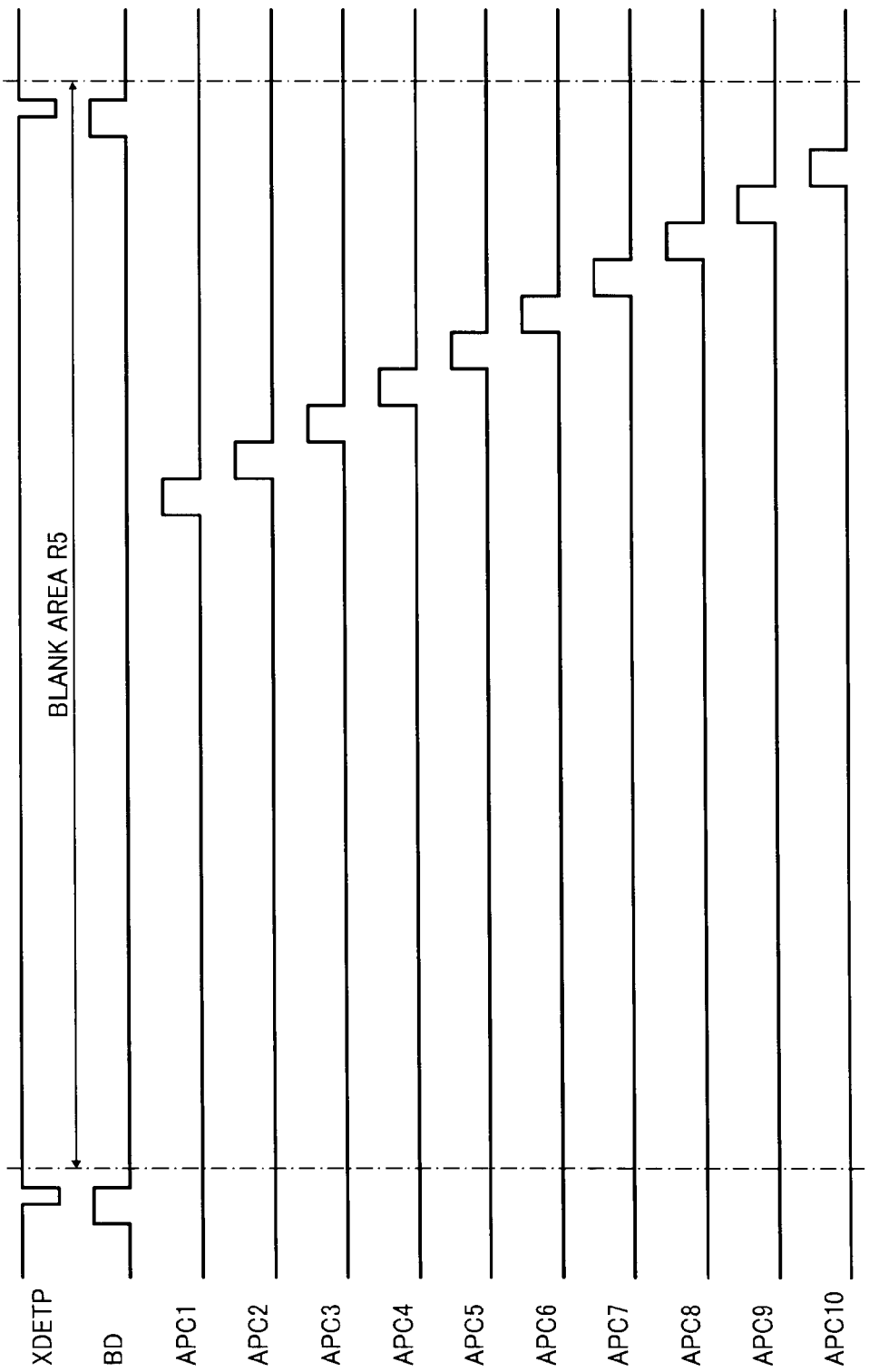
FIG. 23 illustrates a timing chart of APC operation, which is executed for light intensity control at an blank area, which is set between two image area.

FIG. 22 illustrates an exploded view of photoconductor 40 to show an image area and a blank area, in which the photoconductor 40 rotates in an arrow direction, and an image forming interval area D may be set between two image-writing operations (e.g., between first image and second image), which may correspond to a sheet-to-sheet interval. In example embodiment, during an image writing operation in main scanning direction, the APC operation may be conducted at the blank area R2, which may be at a downstream of the image area R1 in the main scanning direction as shown in FIG. 22(1). As illustrated in FIG. 22(2), a blank area R3 may be set at the image forming interval area D. As illustrated in FIG. 22(3), a blank area R4 may be set at a downstream of image area R1 in the main scanning direction including the image forming interval area D to conduct the APC operation at a given timing. When LD1 to LD10 are activated at such blank areas R2, R3, R4, such activated condition of LD has no effect to the image area R1, by which no effect occurs to the image forming operation. Further, FIG. 23 illustrates a timing chart for APC operation conducted at the blank area R5 shown in FIG. 22(1), which may correspond to the image forming interval area D (or sheet-to-sheet interval). The APC signal (e.g., APC1 to APC10) can be output at any timing between adjacent two signals of image-writing-starting synchronization detection signal XDETP are output. The blank area R5 can be also used for forming the correction pattern to conduct a correction process.

As illustrated in FIG. 4, the image-writing-starting synchronization detection signal XDETP detected by the synchronization sensor 127 is input to the synchronization detection lighting controller 204, and the synchronization detection lighting controller 204 outputs APC signal to the LD controller 205. As illustrated in the timing chart of FIG. 21, the image-writing-starting synchronization detection signal XDETP and the compulsory activation signal BD (which activates a LD to output XDETP), are also output to the LD controller 205. In an example embodiment shown in FIG. 6, because the light sources of LD1 to LD10 are shifted each other in main scanning direction with a given pitch, a correction corresponding to such shift value with respect to a reference LD may be required, wherein the reference LD is used to generate the image-writing-starting synchronization detection signal XDETP.

When the beam number is changed, a LD used for generating a image-write-start-side synchronization detection signal may be changed. For example, during the normal image forming line speed, LD1 may be used as a reference LD to generate the image-write-start-side synchronization detection signal. At the 80% image forming line speed, LD1 is in deactivated condition for image writing, and thereby LD2 may be used as a reference LD to generate the image-write-start-side synchronization detection signal, in which a image writing starting position may be shifted from LD1 to LD2 for one pitch set between adjacent LDs, in which a correction corresponding to such shift may be in need.

However, in an example embodiment, even if the beam number is changed or not, same LD such as LD1 may be always used as reference LD to generate the image-write-start-side synchronization detection signal. With such a configuration, even if the beam number is changed, no correction is in need for detecting the image writing starting position. As above described, even if LD1 is not used for image writing, LD1 is activated to emit a light beam for synchronization detection process when an BD signal is output, by which, no correction is in need for detecting the image writing starting position.

Figure 24:
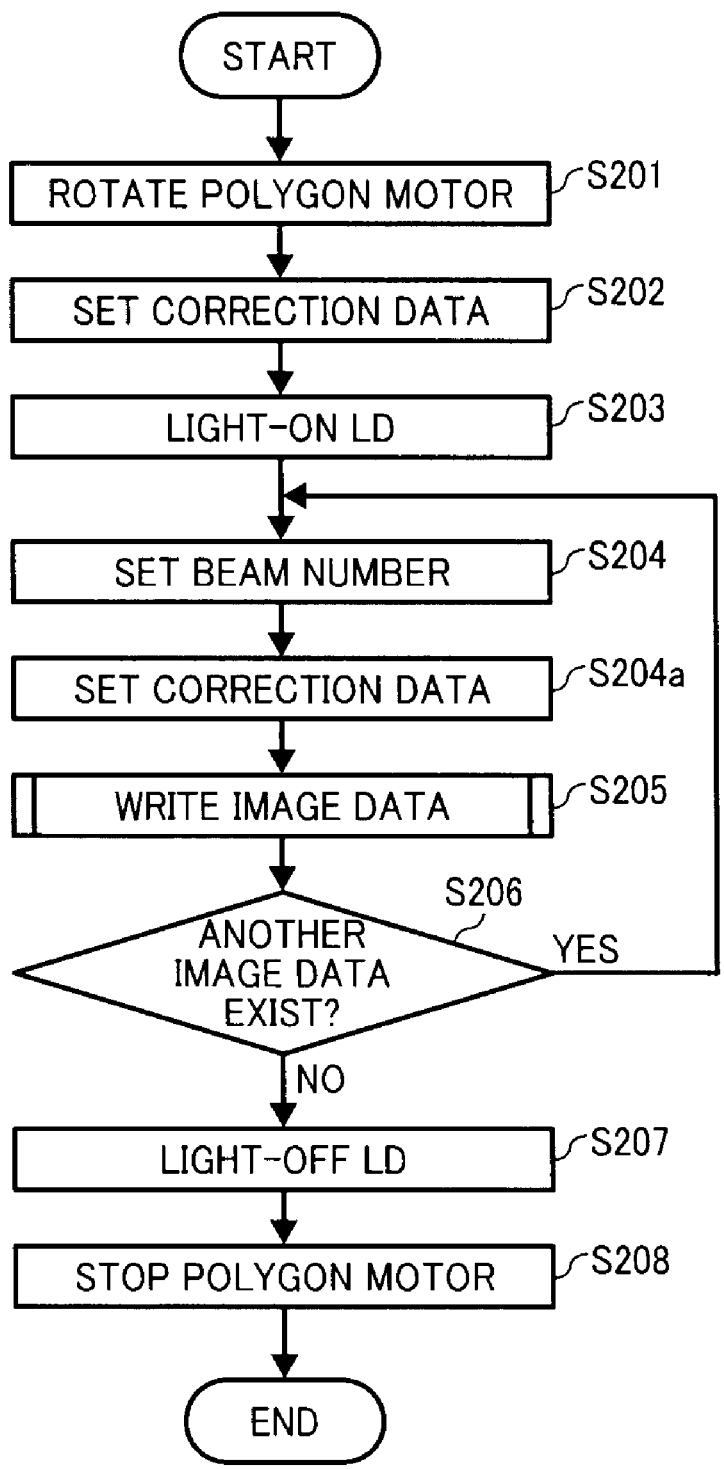
FIG. 24 illustrates a flowchart of image position misalignment correction process at reduced image forming line speed without changing rotation number of polygon motor, in which XFGATE signal timing is corrected based on beam number change.

Further, in an example embodiment, light sources may be disposed as illustrated in FIG. 6, by which when the beam number changes, image position in sub-scanning direction may change. Accordingly, correction data to correct XFGATE signal timing depending on the change of beam number may set to the writing start-position controller 209 from the printer controller 201. FIG. 24 illustrates a flowchart for such correction process. The flowchart of FIG. 24 is similar to the flowchart of FIG. 20, in which the image forming line speed is decreased without changing rotation number of polygon motor, and a process of setting correction data (step S204a) is added after step S204. In FIG. 24, step S201 to step S204 of FIG. 20 are similarly conducted, and set the beam number according to image forming line speed (step S204). At step S204a, the correction data used to correct XFGATE signal timing depending on the beam number change is set to the writing start-position controller 209 using the printer controller 201. Then, step S205 and subsequent steps are conducted as similar to the flowchart of FIG. 20.

With such processing, even if the beam number is changed, image misalignment in sub-scanning direction can be corrected.

A description is now given to a second example embodiment, in which a surface emitting laser such as vertical cavity surface emitting laser (hereinafter VCSEL) is used as a light source to write an image on the photoconductor 40 instead of a LD array used in first example embodiment. The LD array having a plurality of LDs can be used as light source (see FIG. 6), but such LD array has a limitation on light source numbers due to size limitation of LD. In view of such situation, surface emitting laser VCSEL having a greater number of light sources is devised.

Figure 25:
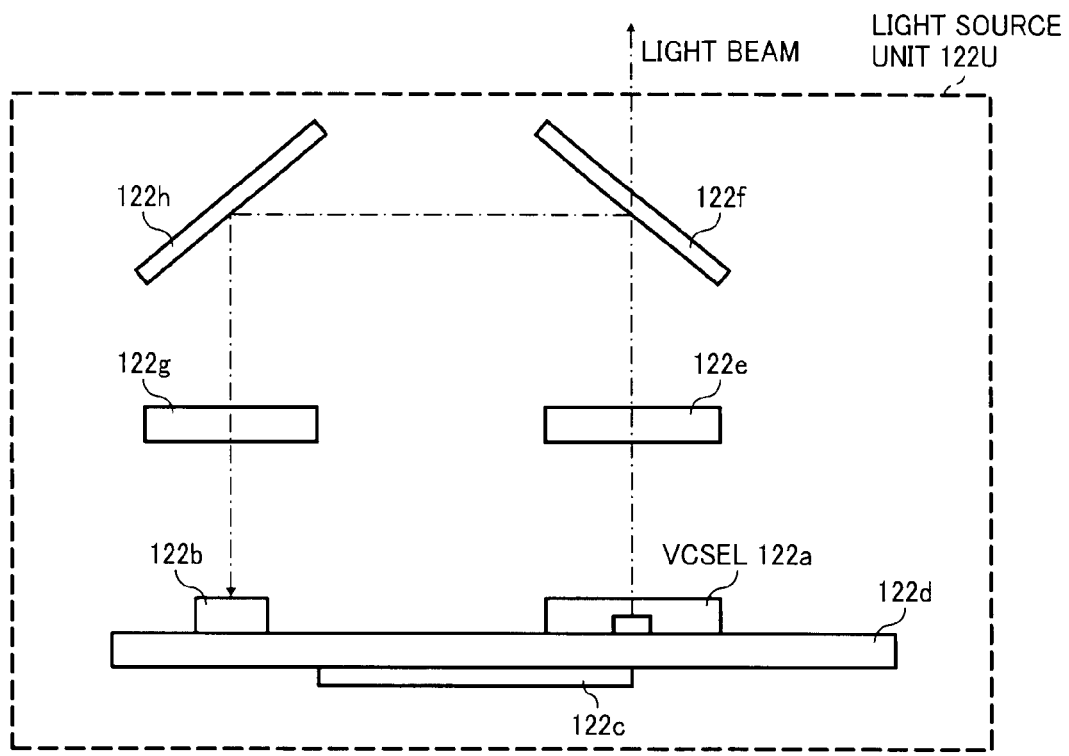
FIG. 25 illustrates a light source unit using VCSEL as light source for an image forming apparatus according second example embodiment.

FIG. 25 illustrates an optical system of light source unit 122U using VCSEL as a light source. The light source unit 122U may include a VCSEL 112a, a light intensity detection device 122b, a collimate lens 122e, an aperture mirror 122f, a lens 122g, and a mirror 122h, for example. The VCSEL 112a and the light intensity detection device 122b may be disposed on a control board 122d with a controller 122c. For example, the VCSEL 112a and the light intensity detection device 122b may be disposed on one face of the control board 122d, and the controller 122c may be disposed on an opposite face of the control board 122d.

In FIG. 25, a light beam emitted from the VCSEL 112a is collimated by the collimate lens 122e, and split into a light beam (or passing light) going to a surface of the photoconductor 40 via the aperture mirror 122f, and a light beam (or reflection light) going to the light intensity detection device 122b. The reflection light is further reflected by the mirror 122h, focused by the lens 122g to enter the light intensity detection device 122b, which detects light intensity of reflection light. The controller 122c may include a light source controller 205a, and a light intensity detector 220 (see FIG. 27). The light source controller 205a controls activation of the VCSEL 112a. The light intensity detector 220 detects light intensity of light beam based on a signal output from the light intensity detection device 122b. As such, the light intensity detection device 122b, the light intensity detector 220, and the light source controller 205a may function as a light intensity controller with the printer controller 201.

Figure 26:
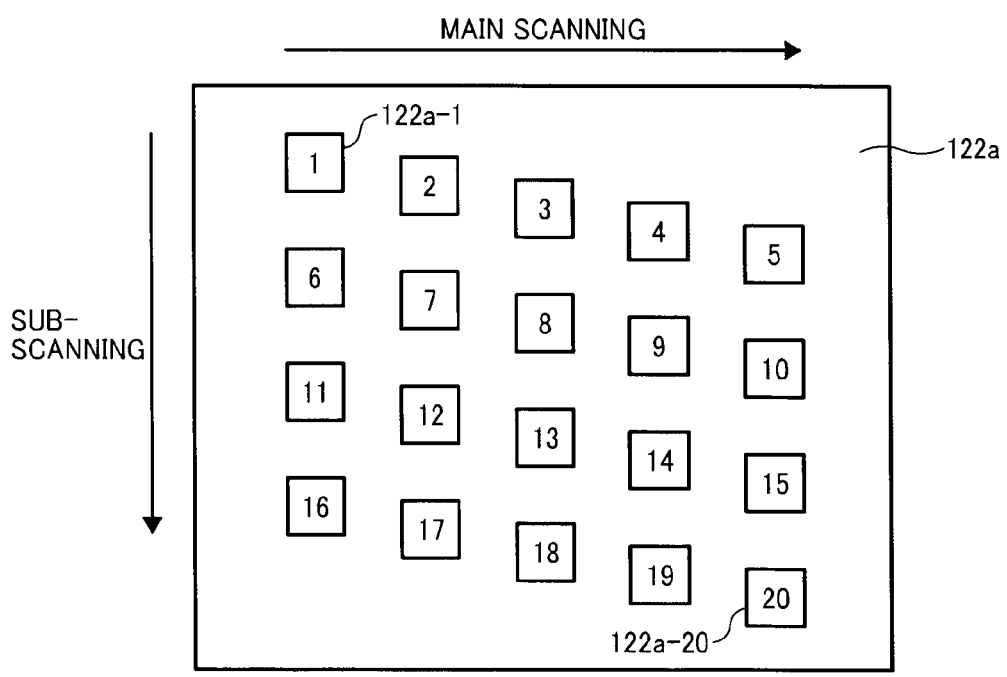
FIG. 26 illustrates an example arrangement pattern of light sources in VCSEL of FIG. 25.

FIG. 26 illustrates a schematic view of light sources disposed and arranged in the VCSEL 112a with a given pattern. In second example embodiment, the VCSEL 112a may include twenty light sources (1 to 20 in FIG. 26) while shifted each other with a given pitch in main scanning direction and sub-scanning direction. With such arrangement, image writing or forming of 20 lines can be conducted by one (1) scanning operation.

Figure 27:
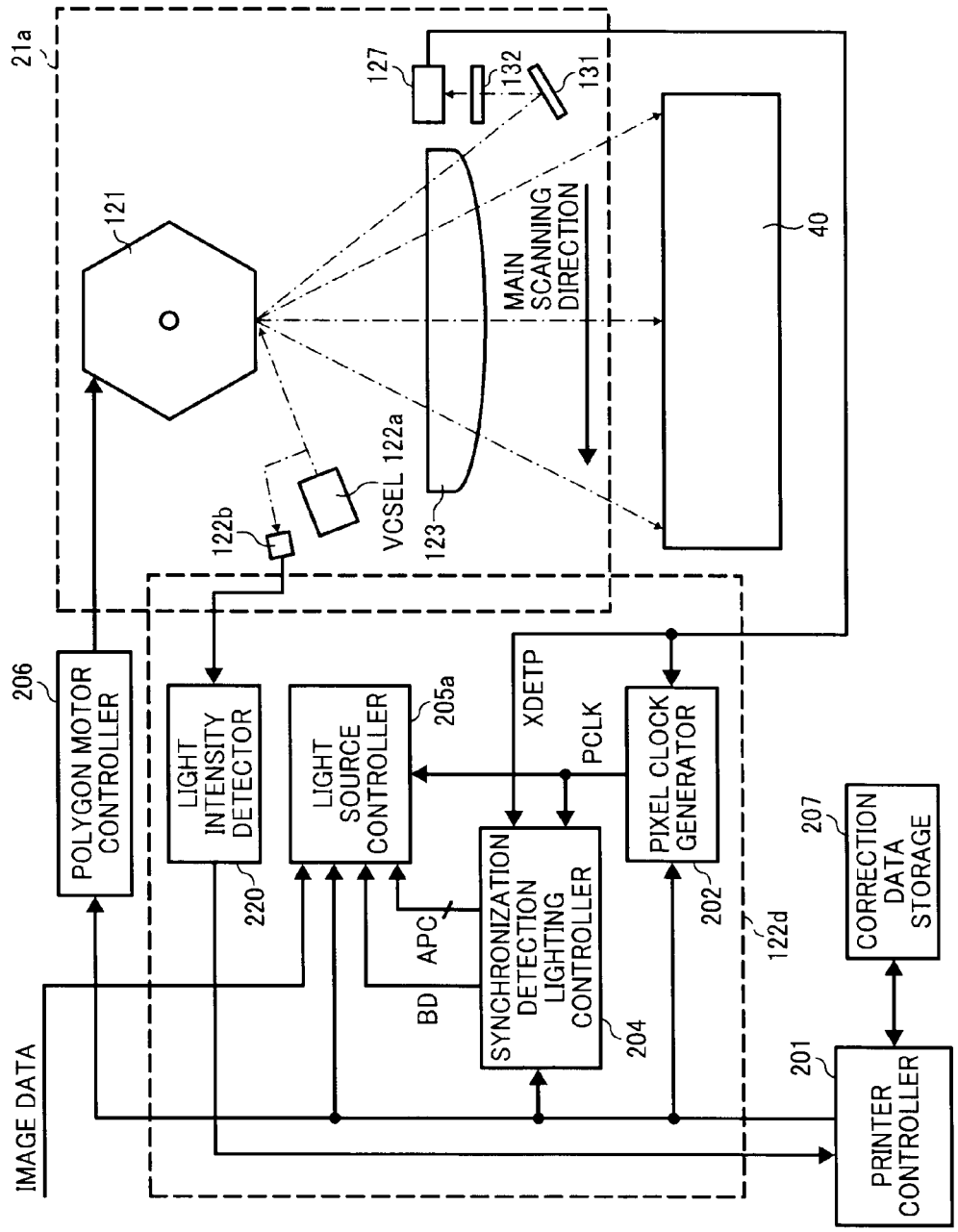
FIG. 27 illustrates a schematic configuration of image forming control system of multi-beam writing unit for second example embodiment.

FIG. 27 illustrates an image forming control system and an optical writing unit 21a for second example embodiment, which may correspond to an image forming control system and the optical writing unit 21 of first example embodiment (see FIG. 4). The optical writing unit 21a may be used a light scanning unit. Instead of the LD unit 122 in first example embodiment, the VCSEL 112a is used as light source in second example embodiment. With such change of light source, the light source controller 205a is used instead of the LD controller 205 and the writing start-position controller 209 in first example embodiment. Further, the light intensity detector 220 is disposed to detect light intensity using a detection signal of light intensity detection device 122b. Further, a detection signal of light intensity detector 220 is input to the printer controller 201, and the printer controller 201 outputs a control signal to the light source controller 205a. Further, the control board 122d may be disposed for each of colors.

The synchronization detector 127 may be disposed at one end of main scanning direction of the optical writing unit 21a to detect light beam to determine an image writing starting end. A light beam passes through the f-theta lens 123, and is reflected at the synchronization mirror 131, and focused by the synchronization lens 132 to enter the synchronization detector 127. When the light beam is detected by the synchronization detector 127, the synchronization detector 127 outputs the image-writing-starting synchronization detection signal XDETP. The image-writing-starting synchronization detection signal XDETP is transmitted to the pixel clock generator 202 and the synchronization detection lighting controller 204.

The pixel clock generator 202 generates the pixel clock PCLK synchronized to the image-writing-starting synchronization detection signal XDETP, and transmits the pixel clock PCLK to the light source controller 205a and the synchronization detection lighting controller 204. To detect the image-writing-starting synchronization detection signal XDETP at first, the synchronization detection lighting controller 204 sets a compulsory activation signal BD to "ON" to activate the LD compulsory. Once the detection of image-writing-starting synchronization detection signal XDETP is started, the LD is activated with a timing that the image-writing-starting synchronization detection signal XDETP can be detect effectively without generating a flare light using the image-writing-starting synchronization detection signal XDETP and the pixel clock PCLK. When the image-writing-starting synchronization detection signal XDETP is detected correctly, the synchronization detection lighting controller 204 sets a compulsory deactivation signal to light off the LD, and transmits the deactivation signal to the light source controller 205a. The image-writing-starting synchronization detection signal XDETP may be detected by activating one light source as similar to first example embodiment. Other parts function in a similar manner as first example embodiment.

Figure 28:
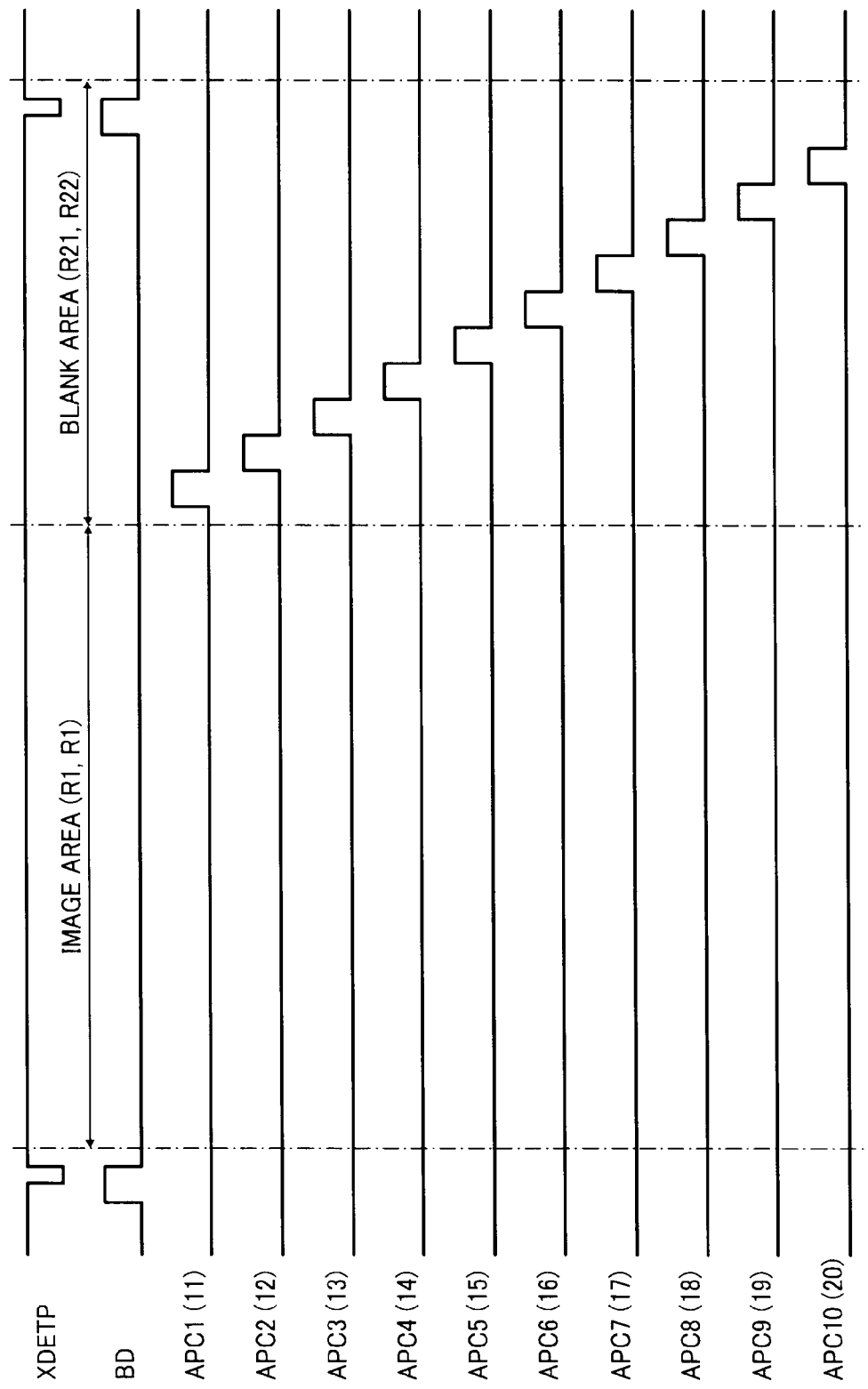
FIG. 28 illustrates a timing chart of output timing of light intensity control timing signal (APC signal) for each of light sources in second example embodiment.

FIG. 28 illustrates a timing chart of output timing of control timing signals such as APC signal (APC1 to APC20) for controlling light intensity of each of light sources in second example embodiment. As similar to a case of FIG. 21, APC1 to APC20 may be generated using the image-writing-starting synchronization detection signal XDETP and the pixel clock PCLK at a blank area on the photoconductor 40. Further because of the configuration of light sources (see FIG. 26), APC signals may be output at different timing for each of light sources. Further, because the number of light sources is increased, light intensity control such as APC is conducted two (2) times. Specifically, APC1 to APC10 is conducted for ten (10) light sources in one (1) scanning operation, and APC11 to APC20 is conducted for another ten (10) light sources in another one (1) scanning operation. As such, the scanning operation may be conducted for two (2) times to execute the APC operation for all twenty (20) light sources. Accordingly, APC1 and APC11, APC2 and APC12, . . . , APC10 and APC20 may become a same timing signal, and APC1 and APC11, APC2 and APC12, . . . , APC10 and APC20 are switched between two scanning operations. FIG. 22(4) shows example APC operation for such configuration, in which the APC light intensity control for light sources as is executed at the blank areas R21 and R22 in main scanning direction, in which one APC operation is conducted for 10 lines, and another APC operation is conducted for another 10 lines. If 40 light sources are used, the APC for 10 light sources is executed for one (1) scanning operation, and 4 scanning operations are executed to execute light intensity control such as APC for all 40 light sources.

Accordingly, the number of light sources that receives the light intensity control such as APC per one scanning (or writing) operation may can be set according to a total number of light sources. In first and second example embodiments, ten (10) light sources are used for one light intensity control such as APC per one scanning (or writing) operation. Accordingly, if a total number of light source is 20, light intensity control can be completed by conducting two (2) scanning operations. If a total number of light source is 40, light intensity control can be completed by conducting four (4) scanning operations. Such light intensity control may be conducted for each of image writing operations, for example.

In FIG. 22(4), one (1) scanning operation is conducted using two (2) lines, in which the first one line is used as a first half of one scanning (or writing) operation, and the second one line is used as a second half of one scanning operation. In such configuration, the light intensity control such as APC is conducted for the first half of one scanning operation at the blank area R21, and the light intensity control such as APC) is conducted for the second half of one scanning operation at the blank area R22.

In the light intensity control such as APC, light sources are activated at a timing of light intensity control timing signal such as APC signal (e.g., APC1 to APC20), and then the light intensity detection device 122b detects light intensity of light beam emitted from the light sources. The light source controller 205a controls light intensity at a given level based on the detected light intensity. With such controlling, light intensity of light beam emitted from the VCSEL 112a can be maintained at a given constant value reliably. Accordingly, when an image writing operation is conducted, the light source controller 205a controls activation of light sources 1 to 20 such as lasers using image data synchronized to the compulsory activation signal BD and the pixel clock PCLK. With such a configuration, the light source unit 122U can emit a light beam, and the light beam is deflected at the polygon mirror 121, passes through the f-theta lens 123, and scans the photoconductor 40 to write image data.

In the above-described example embodiments, when a LD array or VCSEL is used, the APC operation is not executed at an image area, but the APC operation is executed for all light sources at the blank areas R2, R3, R4, R5, R21, R22.

The number of activated light sources is changed in line of the image forming line speed such as from the normal image forming line speed, which activates all light sources, to the reduced image forming line speed, which activates some light sources (i.e., some light sources are deactivated at the reduced image forming line speed). When the image forming line speed is switched from the reduced image forming line speed to the normal image forming line speed, the number of activated light sources is increased (e.g., all light sources are activated). In such process, the most recently deactivated light sources can be activated at a same light intensity level of other already activated light sources, by which an image writing operation can be conducted effectively and efficiently.

When the most recently deactivated light sources are returned to activated condition, such deactivated light sources are already adjusted for light intensity, by which the change of beam number may not cause unnecessary activation of light sources compared to the conventional configuration, and a switching time between two image writing operations can be reduced, and thereby a next image writing operation can be started with a shorter time.

Further, because such deactivated light sources are already adjusted for light intensity, by which an image writing operation can be conducted reliably just after switching the image writing operation.

Further, when the image writing operation is the switched, image-write timing in sub-scanning direction is controlled and adjusted, by which image misalignment can be reduced, and thereby a high quality image can be output.

In the above-described exemplary embodiments, a computer can be used with a computer-readable program to control functional units used for the printer controller 201. For example, a particular computer may control the image forming apparatus and system using a computer-readable program, which can execute the above-described processes or steps. Further, in the above-described exemplary embodiments, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), a memory card, a memory chip, a mini disk (MD), a magneto optical disc (MO), magnetic tape, hard disk such in a server, or the like, but not limited these. Further, a computer-readable program can be downloaded to a particular computer (e.g., personal computer) via a network, or a computer-readable program can be installed to a particular computer from the above-mentioned storage device, by which the particular computer may be used for the image forming apparatus and system according to exemplary embodiments, for example.

The above described example embodiments can be preferably applied to an image forming apparatus using a multi-beam writing unit as optical writing unit, in which a plurality of light sources are used to optically write images with a plurality of lines in one scanning (or writing) operation.

In the above described example embodiments, an image writing operation is conducted using an image area on an image bearing member by setting the number of activated light sources according to the image forming line speed using image data. Because the light intensity control is executed for all light sources at a blank area, even when the beam number is changed, unnecessary toner image may not be formed on an image bearing member, and a deterioration of print speed can be suppressed.

In conventional multi-beam writing unit, when the beam number is changed, unnecessary toner image may be formed, and various control steps may be required when the beam number is changed, and thereby an image forming efficiency may be degraded. In view of such situation, a method of preventing formation of unnecessary toner image, and suppressing the degradation of print speed is devised.

In example embodiments, during an image writing or forming operation, the number of light beams may be changed according to image forming line speed. Specifically, the number of light beams may be changed according to image forming line speed when forming a latent image using image data, wherein the number of light beams is changed by changing the number of channels of light sources such as for example laser diodes. In an image forming apparatus according to example embodiments, unnecessary light-ON of light source) can be prevented even when the beam number is changed, and switching time of image writing or forming operation caused by changed beam number can be reduced.

In an image forming apparatus according to example embodiments, the number of light beams is changed at an image area, which means the number of activated light sources used for writing an image is changed, but a light intensity control is executed for all light sources at a blank area.

In an image forming apparatus according to example embodiments, synchronization detection for image writing may be conducted by emitting a light beam from a same light source in any cases such as when all light sources are activated for image writing, and when some light sources are activated for image writing while other sources are deactivated.

In an image forming apparatus according to example embodiments, when the number of activated light sources is changed (i.e., reduced), an image line corresponding to deactivated light source(s) is not formed, by which such image line is not formed as image. In view of such effect, an image-writing starting time in sub-scanning direction is controlled to prevent image position misalignment caused by the change of beam number.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus comprising:
a plurality of light sources, each of the light sources switchable between an activated condition and a deactivated condition according to supplied image data;
a light intensity controller that executes light intensity control to control light intensity of each one of the light sources;
an optical writing unit including a deflector to deflect a plurality of light beams output from the plurality of light sources in a main scanning direction;
a controller to set a given number of light sources to the activated condition to optically write a latent image on an image bearing member according to an image forming line speed of a light scanning unit; and
an image forming unit to develop the latent image written on the image bearing member as a visible image to be formed on a recording medium,
the controller instructing the given number of light sources to emit light beams onto an image area set on the image bearing member based on the supplied image data, and instructs all of the light sources to emit light beams at a blank area set on the image bearing member to execute a light intensity control for all of the light sources.

2. The image forming apparatus according to claim 1, wherein the controller instructs all of the light sources to emit light beams at a normal image forming line speed mode of the light scanning unit, and instructs fewer than all of the number of light sources to emit light beams at a reduced image forming line speed mode of the light scanning unit.

3. The image forming apparatus according to claim 1, wherein the light scanning unit includes a light beam detector to detect one or more of the plurality of light beams deflected by the deflector, and
the controller sets one of the light sources as a reference light source to emit a light beam to be detected by the light beam detector,
the reference light source being used to emit the light beam detected by the light beam detector to set an image writing starting position, the reference light source being continuously used.

4. The image forming apparatus according to claim 3, wherein the controller establishes the image area and the blank area in a main scanning direction of the image bearing member based on the light beam detected by the light beam detector,
the image area and blank area in the main scanning direction being mutually exclusive areas of the image bearing member.

5. The image forming apparatus according to claim 4, wherein the controller executes the light intensity control at that blank area that is mutually exclusive to the image area in the main scanning direction.

6. The image forming apparatus according to claim 1, wherein the controller sets a plurality of image areas on the image bearing member in a sub-scanning direction and sets blank areas between adjacent image areas, and executes the light intensity control at the blank areas set between the adjacent image areas.

7. The image forming apparatus according to claim 5, wherein a given number of light sources fewer than the plurality of light sources forms one sub-set, and the light intensity control conducted for all of the light sources is conducted by repeating the light intensity control for the sub-set until the light intensity control for all of the light sources is completed.

8. The image forming apparatus according to claim 1, wherein the number of light sources to emit light beams is determined based on the image forming line speed, and the controller sets an image-write timing in the sub-scanning direction according to the number of light sources determined based on the image forming line speed.

9. The image forming apparatus according to claim 1, wherein at least one light source from the plurality of light sources includes a laser diode array in which a plurality of laser diodes are arranged in a given pattern.

10. The image forming apparatus according to claim 1, wherein at least one light source from the plurality of light sources includes a vertical cavity surface emitting laser (VCSEL).

11. A method of controlling light intensity of a plurality of light sources useable in an image forming apparatus, each one of the light sources switchable between an activated condition and a deactivated condition according to image data, the image forming apparatus including:

a light intensity controller to control light intensity of each one of the light sources, an optical writing unit including a deflector to deflect a plurality of light beams output from the plurality of light sources in a main scanning direction, a controller to set a given number of light sources to the activated condition according to image forming line speed of a light scanning unit to optically write a latent image on an image bearing member, and an image forming unit to develop the latent image written on the image bearing member as a visible image to be formed on a recording medium, the method comprising the steps of:

establishing one or more mutually exclusive image areas and one or more image-non-writing areas on the image bearing member;

emitting light beams from a given number of light sources onto the one or more image areas established on the image bearing member based on supplied image data; and executing light intensity control for all of the light sources by emitting light beams from all of the light sources at one or more of blank areas established on the image bearing member.

12. The method according to claim 11, wherein the light scanning unit includes a light beam detector to detect one or more of the plurality of light beams deflected by the deflector, the method further comprising the steps of:

emitting a light beam from one of the light sources as a reference light source; and detecting the light beam from the reference light source using the light beam detector.

13. The method according to claim 12, the method further comprising the step of:

establishing the one or more image areas and the one or more blank areas in a main scanning direction of the image bearing member based on the light beam detected by the light beam detector, the one or more image areas and the one or more blank areas being mutually exclusive areas of the image bearing member.

14. The method according to claim 13, the method further comprising the step of:

executing the light intensity control at the one or more blank areas set outside the image area in the main scanning direction.

15. The method according to claim 11, wherein the one or more image areas are settable on the image bearing member in a sub-scanning direction for a plurality of image areas, and the one or more blank areas are settable between adjacent image areas, and the method further comprising the steps of:

executing the light intensity control at the one or more blank areas set between the adjacent image areas.

16. The method according to claim 14, the method further comprising the step of:

executing the light intensity control at a blank area set between adjacent image areas set on the image bearing member in a sub-scanning direction.

17. The method according to claim 11, the method further comprising the steps of:

determining the number of light sources to emit light beams based on the image forming line speed; and setting an image-write timing in the sub-scanning direction according to the number of light sources determined based on the image forming line speed.

18. A non-transitory computer-readable storage medium having executable instructions stored therein that when executed by a processor in an image forming apparatus causes the processor to execute a method of controlling light intensity of a plurality of light sources, the image forming apparatus including:

the plurality of light sources, each of the light sources switchable between an activated condition and a deactivated condition according to image data, a light intensity controller to control light intensity of each one of the light sources, an optical writing unit including a deflector to deflect a plurality of light beams output from the plurality of light sources in a main scanning direction, a controller to set a given number of light sources to the activated condition according to an image forming line speed of a light scanning unit to optically write a latent image on an image bearing member, and an image forming unit to develop the latent image written on the image bearing member as a visible image to be formed on a recording medium, the method comprising the steps of:

establishing one or more mutually exclusive image areas and one or more image-non-writing areas on the image bearing member;

emitting light beams from a given number of light sources onto the one or more image areas established on the image bearing member based on supplied image data; and executing a light intensity control for all of the light sources by emitting light beams from all of the light sources at one or more blank areas established on the image bearing member.

* * * * *